(12) United States Patent
Pirozzi et al.

(10) Patent No.: US 7,791,304 B2
(45) Date of Patent: Sep. 7, 2010

(54) METHOD AND DEVICE FOR DETERMINING THE DUTY-CYCLES OF PWM CONTROL SIGNALS OF AN INVERTER

(75) Inventors: Francesco Pirozzi, Napoli (IT); Maurizio Di Meglio, Casoria (IT); Stefano Baratto, Napoli (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 371 days.

(21) Appl. No.: 12/014,955

(22) Filed: Jan. 16, 2008

(65) Prior Publication Data
US 2008/0169780 A1 Jul. 17, 2008

(30) Foreign Application Priority Data
Jan. 17, 2007 (IT) .................. VA2007A0010

(51) Int. Cl.
*H02P 27/04* (2006.01)
*H02P 27/08* (2006.01)
(52) U.S. Cl. ............... 318/599; 318/811; 318/400.02
(58) Field of Classification Search ............. 318/599, 318/810, 811, 400.01, 400.02
See application file for complete search history.

(56) References Cited

U.S. PATENT DOCUMENTS

| | | | | |
|---|---|---|---|---|
| 6,643,149 B2 * | 11/2003 | Arnet et al. | | 363/41 |
| 6,653,812 B1 * | 11/2003 | Huo et al. | | 318/801 |
| 7,075,267 B1 * | 7/2006 | Cheng | | 318/807 |
| 7,209,064 B1 * | 4/2007 | Gaboriau et al. | | 341/152 |
| 2006/0138994 A1 | 6/2006 | Cheng | | 318/807 |
| 2008/0174260 A1 * | 7/2008 | D'Angelo et al. | | 318/650 |

(Continued)

FOREIGN PATENT DOCUMENTS
EP 1713168 10/2006

OTHER PUBLICATIONS

Raed H. Ahmad, George G. Karady, Tracy D. Blake, and Peter Pinewski, "Comparison of Space Vector Modulation Techniques Based on Performance Indexes and Hardware Implementation", pp. 682-687.

(Continued)

*Primary Examiner*—Walter Benson
*Assistant Examiner*—Eduardo Colon
(74) *Attorney, Agent, or Firm*—Lisa K. Jorgenson; Allen, Dyer, Doppelt, Milbrath & Gilchrist, P.A.

(57) ABSTRACT

A method for determining duty-cycles of respective pulse width modulated (PWM), space vector modulated (SVM) control signals of an inverter, may include storing values of the duty-cycles as a function of a position of the multi-phase electric load in a look-up table. The method also may include determining a phasor angle representing applied sinusoidal voltages. The method also may include determining the duty-cycles as a function of the angle, and storing, in the look-up table, values of two pre-established waveforms relative to at least one duty-cycle as a function of the angle in at least two 60° degree angular sectors, by at least, identifying which of six 60° angular sectors the angle belongs, calculating a difference between the angle and an angular sector lower bound, and generating values as a function of the identified angular sector of the difference and the two pre-established waveforms stored in the look-up table.

11 Claims, 22 Drawing Sheets

U.S. PATENT DOCUMENTS

2008/0180095 A1* 7/2008 D'Angelo et al. ........... 324/234
2008/0258673 A1* 10/2008 Welchko et al. ............. 318/811

OTHER PUBLICATIONS

Tsung-Po Chen, Yen-Shin Lai, and Chang-Huan Liu, "A New Space Vector Modulation Technique for Inverter Control", 1999 IEEE, pp. 777-782.

C. Attaianese, D. Capraro, G. Tomasso, Member, IEEE, "A Low Cost Digital SVM Modulator with Dead Time Compensation", 2001 IEEE, pp. 158-163.

Keliang Zhou and Danwei Wang, Member, IEEE, "Relationship Between Space-Vector Modulation and Three-Phase Carrier-Based PWM: A Comprehensive Analysis", pp. 186-196, 2002, IEEE.

Michael Copelan, Infneon, On-Chip Timers and Registers enable 8-Bit µ Cs to Generate Symmetric Space-Vector PWM Signals for Three-Phase Motors. Generate advanced PWM Signals using 8-bit µ Cs, Feb. 3, 2000.

K. Yamamoto and K. Shinohara, "Comparison between space vector modulation and subharmonic methods for current harmonics of DSP-based permanent-magnet AC servo motor drive system", IEE Proc.-Electr. Power Appl. vol. 143, No. 2, Mar. 1996.

Jian Sun, Horst Grotstollen, "Optimized Space Vector Modulation and Regular-Sampled PWM: A Re-examination", 1996, IEEE.

Toshio Takahaski and Jay Goetz, "Implementation of Complete AC Servo Control in a low cost FPGA and Subsequent ASSP Conversion", 2004, IEEE.

D. Rathnakumer and J. Lakshmana Perumal, "A New Software Implementation of Space Vector PWM", 2005, IEEE.

Data Sheet No. PD60224, Rev. B, IRMCK201, "High Performance Configurable Digital AC Servo Control IC", pp. 1-63.

APO803620, XC866, Optimized Space Vector Modulation and Over-modulation with the XC866, pp. 1-29, Application Note, V2.0, Sep. 2005.

* cited by examiner realization of waveforms in [0, 1023]

translation in [-512,511]

logic circuit for reconstructing waveforms logic circuit for calculating the sector and the angle for accessing the LUTs

METHOD AND DEVICE FOR DETERMINING THE DUTY-CYCLES OF PWM CONTROL SIGNALS OF AN INVERTER

FIELD OF THE INVENTION

This invention relates to control techniques of multi-phase electric loads. More particularly, the invention relates to a method and a device for establishing the duty-cycle of pulse width modulation (PWM) control signals according to a space vector modulation (SVM) mode controlling an inverter that drives a multi-phase electric load.

BACKGROUND OF THE INVENTION

Space Vector Modulation (SVM) is a modulation technique used for controlling induction, controlling brushless motors, and for generating sinusoidal phase voltages starting from a DC voltage source. This technique is widely used because it allows generation of large sinusoidal voltages with a total harmonic distortion (THD) smaller than classical PWM control techniques.

FIG. 1 depicts a control scheme of a common three-phase motor. By driving the switches of each half-bridge with respective PWM signals, the duty-cycle of which varies with time according to a modulating signal, a generally sinusoidal voltage is applied to each winding of the motor. Typically, the control block CONTROL UNIT includes a standard proportional-integral (PI) controller and a logic circuit that generates the driving signals for the desired control action commanded by the controller. The SVM technique is briefly illustrated hereinbelow.

Space Vector Modulation (SVM) may require a sinusoidal modulation of PWM signals for optimizing the switching pattern of the switches of the half-bridges of the inverter. This technique is characterized by a very good modulation ratio, that is the ratio between the rms value of the modulated wave and the mean value thereof. This technique controls the global behavior of the multi-phase system and not the behavior of each single winding.

The SVM technique has many advantages:

high performances in controlling motors at medium/high speed; high efficiency (about 86%); a good torque control; good performance at start-up of the motor; and regulation of the torque at a constant value with a reduced ripple.

For the case of a three-phase motor, referring to FIG. 2, suppose that in a modulation period a triplet of three-phase voltages is to be applied. This triplet may be represented by the vector $\overline{V_S}$, the module and phase of which are V and $\gamma$ respectively, that is comprised between two generic configurations $\overline{V_K}$ and $\overline{V_{K+1}}$ of the six possible active configurations of the inverter that drives the motor. Application of the vector $\overline{V_S}$ is done by applying the vector $\overline{V_K}$ (that in FIG. 2 is $\overline{V_1}$) for a time $\alpha$, the vector $\overline{V_{K+1}}$ (that in FIG. 2 is $\overline{V_2}$) for a time $\beta$ and a null vector $\overline{V_0}$ (000 or 111, are not depicted in FIG. 2) for a time $\delta$, such that in a PWM period the mean value of the voltage equals the vector $\overline{V_S}$.

The intervals during which the vectors $\overline{V_k}$, $\overline{V_{k+1}}$ and $\overline{V_0}$ are applied are those that verify the following integral equation:

$$\int_0^{\Delta T} \overline{V_s}\, dt = \int_0^{\alpha} \overline{V_k}\, dt + \int_0^{\beta} \overline{V_{k+1}}\, dt + \int_0^{\delta} \overline{V_0}\, dt \quad (1)$$

wherein $\Delta T$ is the PWM period and $\alpha$, $\beta$ and $\delta$ are the turn-on times of the upper switches of the inverter. This equation is solved considering that $\overline{V_k}$ and $\overline{V_{k+1}}$ are constant in a module for each of the six sectors, and $\overline{V_S}$ is constant within a PWM period. Equation (1) becomes:

$$\overline{V_S} \cdot \Delta T = \overline{V_k} \cdot \alpha + \overline{V_{k+1}} \cdot \beta + \overline{V_0} \cdot \delta$$

$$\alpha + \beta + \delta = \Delta T \quad (2)$$

Considering that $\overline{V_0} = 0$, it is:

$$\beta = \frac{2}{\sqrt{3}} \frac{V \sin(\gamma - \gamma_k)}{V_k} \Delta T \quad (3)$$

$$\alpha = \frac{V \cos(\gamma - \gamma_k)}{V_k} \Delta T - \frac{\beta}{2}$$

$$\delta = \Delta T - \alpha - \beta$$

being $\gamma$ the angle of the phasor $\overline{V_S}$ that represents the triplet of voltages to be applied to the motor and $\gamma_k$ is the angle of the phasor $\overline{V_k}$.

After having calculated the conduction times, it is necessary to establish the strategy with which the vectors $\overline{V_k}$, $\overline{V_{k+1}}$ and $\overline{V_0}$ are applied. The simplest way is to sequentially establish the conduction times $\alpha$, $\beta$ and $\gamma$ in a period $\Delta T$, as depicted in FIG. 3.

This approach has several drawbacks: uneven switching frequency of the electronic components; and the possibility of simultaneous switching of two half-bridges with a consequent increase of power losses.

The above problems are prevented by properly subdividing each conduction period according to a so-called seven states logic, illustrated in FIG. 4, that allows switching a half-bridge at the time. The same observation made for the first sector holds, with the respective differences having been considered, when the phase $\gamma$ is in the second sector. Of course, in this case, $\alpha$ is not referred to $\overline{V_1}$ but to $\overline{V_2}$. This implies that it may be necessary to take into account the sector to which the phase angle $\gamma$ currently belongs for calculating the correct switching pattern, and thus for correctly carrying out the SVM algorithm. To determine the sector of pertinence, it is necessary to know the phase of the reference vector, that may be calculated with the following formula:

$$\gamma = \arctan\left(\frac{\Im m(\overline{V_s})}{\Re e(V_s)}\right) \quad (4)$$

wherein the operators $\Im m(.)$ and $\Re e(.)$ produce the imaginary part and the real part of their argument.

If $\alpha$, $\beta$ and $\delta$ are known, it is possible to calculate the respective duty-cycles $t_1$, $t_2$, $t_3$ of the high-side of each half-bridge of the inverter using a look-up table that implements the seven-states logic for each sector, as shown in the following table 1:

|    | Sector 0 | Sector 1 | Sector 2 |
|----|----------|----------|----------|
| t1 | $\dfrac{\dfrac{\delta}{4}}{\Delta T}$ | $\dfrac{\dfrac{\beta}{2}+\dfrac{\delta}{4}}{\Delta T}$ | $\dfrac{\dfrac{\Delta T}{2}-\dfrac{\delta}{4}}{\Delta T}$ |

-continued

|    | Sector 1 | Sector 2 | (cont.) |
|----|----------|----------|---------|
| t2 | $\dfrac{\dfrac{\alpha}{2}+\dfrac{\delta}{4}}{\Delta T}$ | $\dfrac{\dfrac{\delta}{4}}{\Delta T}$ | $\dfrac{\dfrac{\delta}{4}}{\Delta T}$ |
| t3 | $\dfrac{\dfrac{\Delta T}{2}-\dfrac{\delta}{4}}{\Delta T}$ | $\dfrac{\dfrac{\Delta T}{2}-\dfrac{\delta}{4}}{\Delta T}$ | $\dfrac{\dfrac{\alpha}{2}+\dfrac{\delta}{4}}{\Delta T}$ |

|    | Sector 3 | Sector 4 | Sector 5 |
|----|----------|----------|----------|
| t1 | $\dfrac{\dfrac{\Delta T}{2}-\dfrac{\delta}{4}}{\Delta T}$ | $\dfrac{\dfrac{\alpha}{2}+\dfrac{\delta}{4}}{\Delta T}$ | $\dfrac{\dfrac{\delta}{4}}{\Delta T}$ |
| t2 | $\dfrac{\dfrac{\beta}{2}+\dfrac{\delta}{4}}{\Delta T}$ | $\dfrac{\dfrac{\Delta T}{2}-\dfrac{\delta}{4}}{\Delta T}$ | $\dfrac{\dfrac{\Delta T}{2}-\dfrac{\delta}{4}}{\Delta T}$ |
| t3 | $\dfrac{\dfrac{\delta}{4}}{\Delta T}$ | $\dfrac{\dfrac{\delta}{4}}{\Delta T}$ | $\dfrac{\dfrac{\beta}{2}+\dfrac{\delta}{4}}{\Delta T}$ |

By comparing (FIG. 5), a triangular modulating signal with three thresholds ta, tb and tc, the six PWM driving signals $a_H$, $b_H$ and $c_H$ and $a_L$, $b_L$ and $c_L$, (H=high-side, L=low-side) that drive the inverter are obtained, as shown in FIG. 5, with respective duty-cycles $t_1$, $t_2$, $t_3$.

The above described procedure implements a so-called PWM center aligned modulation, that implies a symmetry around the mid-point of the PWM period. This configuration produces in each period two pulses line-to-line with the modulating signal. Thus, the effective switching frequency is doubled, with the effect of reducing the ripple of current without the drawback of incrementing the dynamical power consumption of the switching devices of the inverter.

In FIG. 5, the letters a, b, c indicate the first, second and third branch of the inverter, the letter H indicates the high-side switches, and the letter L indicates the low-side switches. FIG. 5 is only a basic scheme that does not accounts for the dead time, that is the time in which both switches must be off for preventing shorts between the supply and ground. The technique is illustrated in greater detail in Shinohara, "Comparison Between Space Vector Modulation and Subharmonic Methods for Current Harmonics of DSP-Based Permanent-Magnet AC Servo Motor Drive System", Sun et al., "Optimized Space Vector Modulation and Regular-Sampled PWM", Chen et al, "A New Space Vector Modulation Technique for Inverter Control", and Zhou et al., "Relationship Between Space-Vector Modulation Technique for Inverter Control."

The SVM technique described above is usually implemented via software by DSPs or microcontrollers equipped with dedicated peripherals. In Rathnakumar et al., "A New Software Implementation of Space Vector PWM", classic software implementations using Matlab and Psim are described that show the great complexity of the calculations required for a correct implementation of the SVM.

In "Optimized Space Vector Modulation and Overmodulation with the XC866", Infeon Application Note AP0803620, V 2.0, a software implementation with an 8-bit microcontroller is shown. In order to make the calculation of the SVM easier, the symmetry about angles of 60° intrinsic to the SVM are exploited, and the values of the sine and cosine functions are stored in a look-up table (LUT). A similar approach is presented also in Copeland, "Generate Advanced PWM Signals Using 8-bit mCs". Also hardware implementations of the SVM are disclosed in the literature. A possible hardware implementation, particularly for implementing a PWM using a Time Processor Unit (TPU) of the microcontroller Motorola 68HC16 is illustrated in Ahmad et al., "Comparison of Space Vector Modulation Techniques Based on Performance Indexes and Hardware Implementation". In Attaianese et al, "A Low Cost Digital SVM Modulator with Dead Time Compensation", a hardware system input with the values of duty-cycles calculated by the microcontroller for carrying out the SVM and correctly driving the inverter, and even compensating the dead time, is described.

In Takahashi et al., "Implementation of Complete AC Servo Control in a Low Cost FPGA and Subsequent ASSP Conversion", a hardware FPGA implementation of a complete control system implementing a so-called Field Oriented Control (FOC) technique is disclosed. The document also discloses a hardware implementation of SVM. This approach has been commercially implemented in two integrated circuits marketed by International Rectifier "High Performance Configurable Digital AC Servo Control IC", International Rectifier DataSheet No. PD60224 Rev. B, and "High Performance Sensorless Motion Control IC", International Rectifier DataSheet No. PD60225 Rev. B.

SUMMARY OF THE INVENTION

An efficient method of determining the three duty-cycles of the three PWM control signals of an inverter that drives a three-phase load in SVM mode and that may require a reduced number of steps has now been found.

The method may advantageously exploit the fact that the three duty-cycles may be modulated, as a function of the angle γ of the phasor that represents the triplet of voltages to be applied, according to modulating signals that may be reconstructed from only two waveforms using reflection and reversal operations. By storing these two waveforms in two look-up tables, it may be possible to reconstruct the modulating signals for each value of the angle γ, with a single memory access and an addition.

According to a preferred embodiment of the method, the values stored in the two look-up tables may be translated and scaled in the interval [−1; 1] before being eventually multiplied by a reference value OUTPI. The reference value output OUTPI is determined by a standard PI (proportional-integral) controller that may determine the module V of the vector $\overline{V_S}$, in order to avoid excessively loading only the switches of the high-side or of the low-side of the inverter.

The method may also be implemented by a circuit generating signals that represent three duty-cycles of three respective PWM control signals in SVM mode of an inverter. As an alternative, the method may be implemented through software executed by a microprocessor.

DETAILED DESCRIPTION OF THE PREFERRED EMBODIMENTS

Compared to a classic SVM technique, according to a first embodiment, a single look-up table is used by accessing the look-up table once for each winding during each PWM period, thus avoiding the otherwise complex calculations necessary for determining the three duty-cycles $t_1$, $t_2$ and $t_3$ that, besides making the computations of the algorithm more onerous, generally require additional hardware resources.

By reformulating equations (3), the following relations are obtained:

$$\beta = \frac{2}{\sqrt{3}} \cdot \frac{V}{V_K} \cdot \sin(\gamma - \gamma_K) \cdot \Delta T \qquad (5)$$

$$\alpha = \frac{V}{V_K} \cdot \left[ \cos(\gamma - \gamma_K) - \frac{1}{\sqrt{3}} \cdot \sin(\gamma - \gamma_K) \right] \cdot \Delta T$$

$$\delta = \Delta T - \alpha - \beta$$

Figure 1:
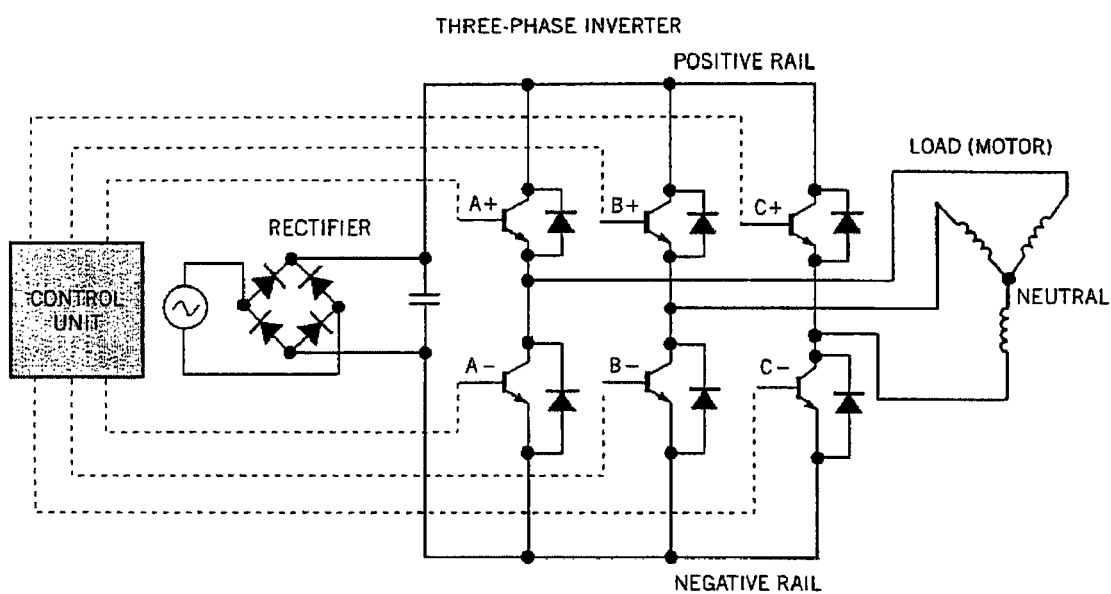
FIG. 1 depicts a prior art control scheme of a three-phase motor through an inverter.
Figure 2:
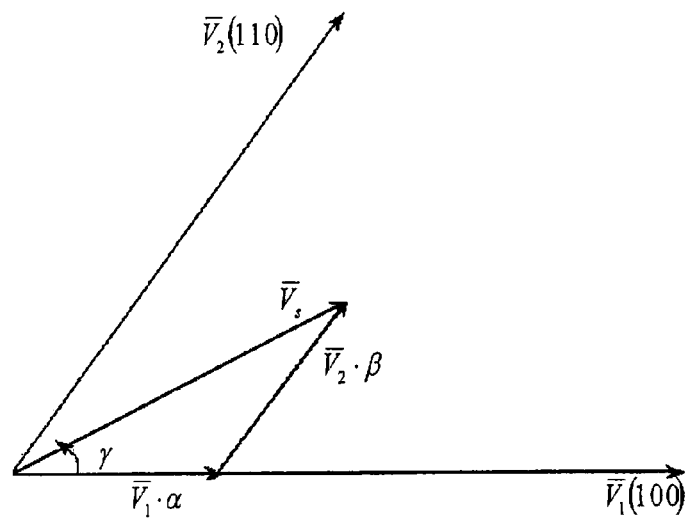
FIG. 2 illustrates a prior art phasor of a Space Vector Modulation.
Figure 3:
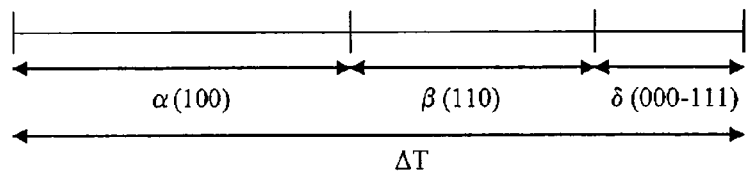
FIG. 3 illustrates how the turn-on time of the switches of the inverter varies for obtaining the phasor depicted in FIG. 2.
Figure 4:
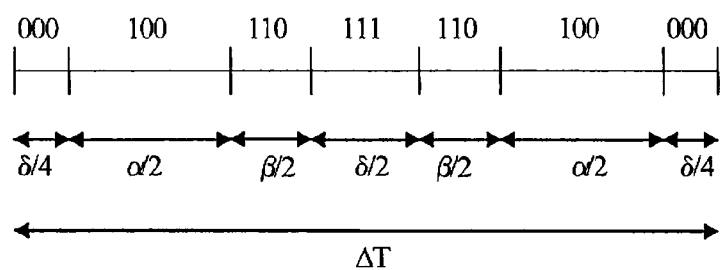
FIG. 4 is a diagram similar to that of FIG. 3 but with seven states.
Figure 5:
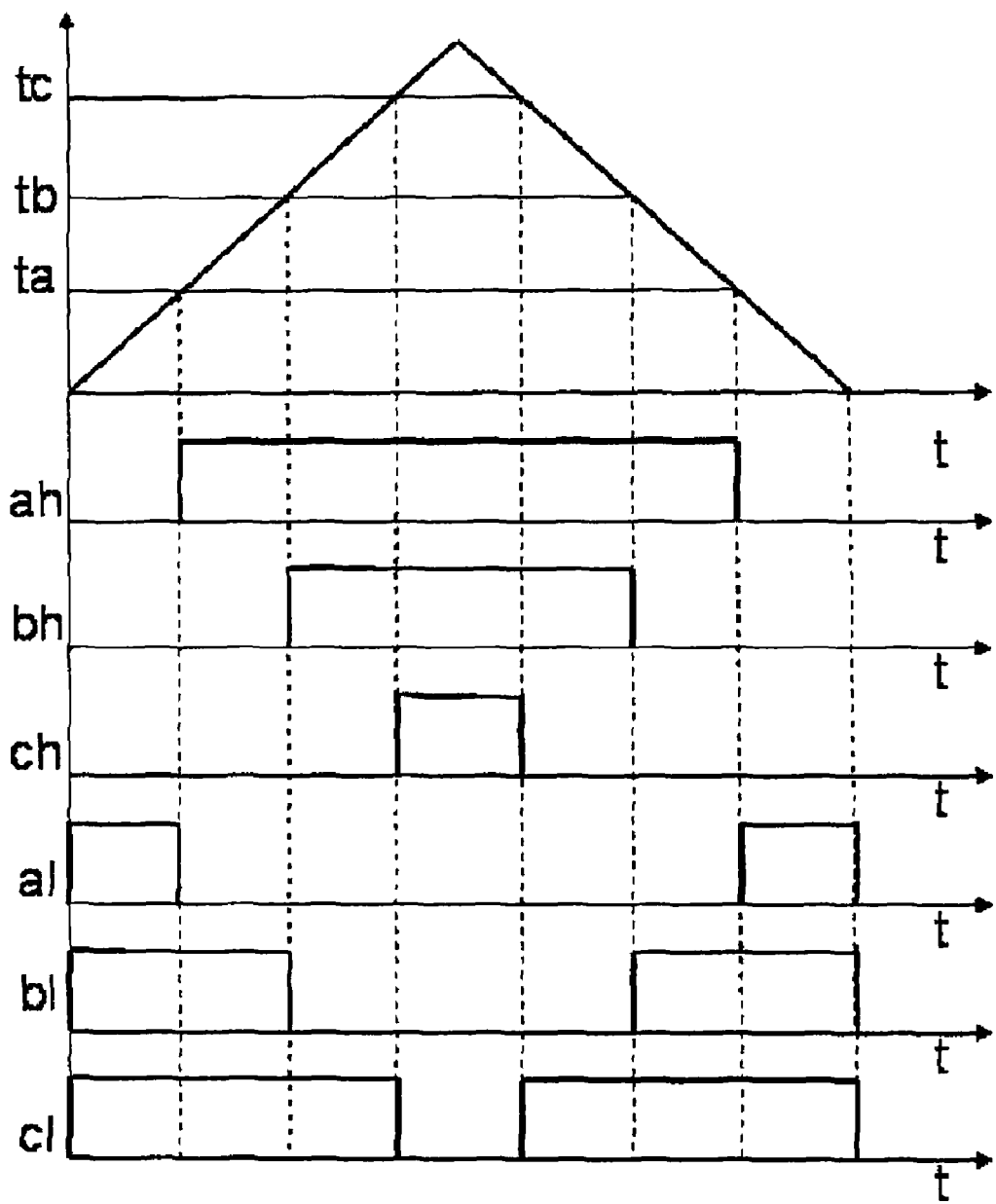
FIG. 5 illustrates prior art sample PWM driving voltages of the high-side and of the low-side of a power stage.
Figure 6:
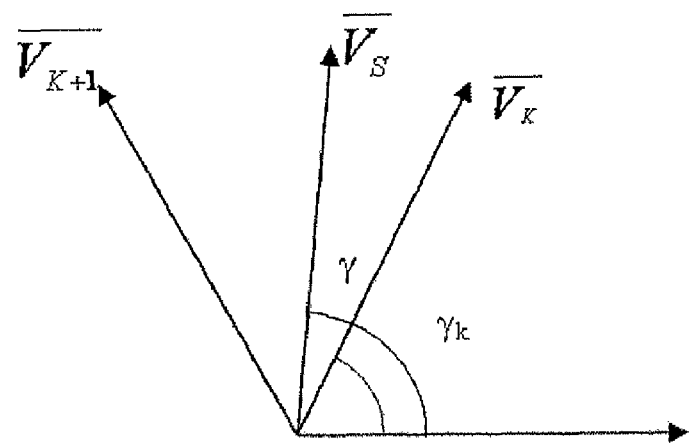
FIG. 6 illustrates a phasor of Space Vector Modulation in sector 2 in accordance with the invention.

$(\gamma - \gamma_K)$ being the angle between $\overline{V_S}$ and $\overline{V_K}$ (FIG. 6). By substituting these equations in Table 1, it is noticed that $t_1$, $t_2$, $t_3$ are a function of the ratio $$\frac{V}{V_K}$$

and of the angle $(\gamma - \gamma_K)$, wherein $V_K$ is the supply voltage of the inverter, V is the module of the control vector $\overline{V_S}$, $\gamma$ is the angle between the phasor $\overline{V_S}$ and the origin of the reference, and $\gamma_K$ is the angle of the phasor $\overline{V_K}$ in respect to the origin of the reference.

It is possible to normalize $t_1$, $t_2$, $t_3$ in respect to the module V of the vector $\overline{V_S}$ thus obtaining the following equations:

$$t'_1 = \frac{t_1}{V} = f_1(\gamma, \gamma_K) \qquad (6)$$

$$t'_2 = \frac{t_2}{V} = f_2(\gamma, \gamma_K)$$

$$t'_3 = \frac{t_3}{V} = f_3(\gamma, \gamma_K)$$

In order to implement the look-up table it is necessary to vary the angle $\gamma$ in the range [0°, 360°] modifying the angle $\gamma_K$ at each 60°, according to Table 2.

TABLE 2

| | |
|---|---|
| $\gamma \in [0, 60°]$ | $\gamma_K = 0°$ |
| $\gamma \in [60°, 120°]$ | $\gamma_K = 60°$ |
| $\gamma \in [120°, 180°]$ | $\gamma_K = 120°$ |
| $\gamma \in [180°, 240°]$ | $\gamma_K = 180°$ |
| $\gamma \in [240°, 300°]$ | $\gamma_K = 240°$ |
| $\gamma \in [300°, 360°]$ | $\gamma_K = 300°$ |

Figure 7:
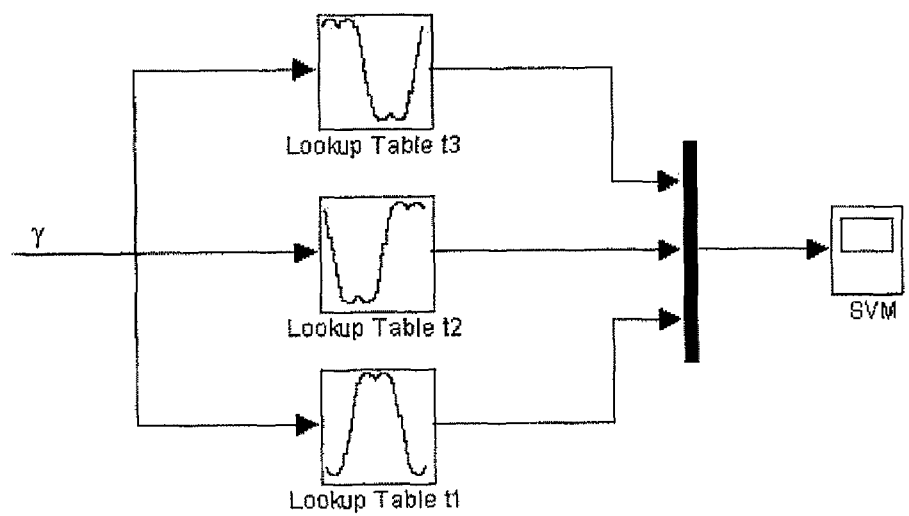
FIG. 7 illustrates how the look-up table of a SVM driving system of this invention.

Therefore, three look-up tables that output the values t'$_1$, t'$_2$, t'$_3$, given the value of the angle $\gamma$, are established. With the relations, (6) the values $t_1$, $t_2$, $t_3$, essential for driving the high-side of the inverter are calculated. The functioning principle of the algorithm is illustrated in FIG. 7. The angle γ as a function of the position of the rotor of the motor is determined by sensing it with dedicated sensors or by estimating it through algorithms. The relative look-up table (LUT) is accessed.

Figure 8:
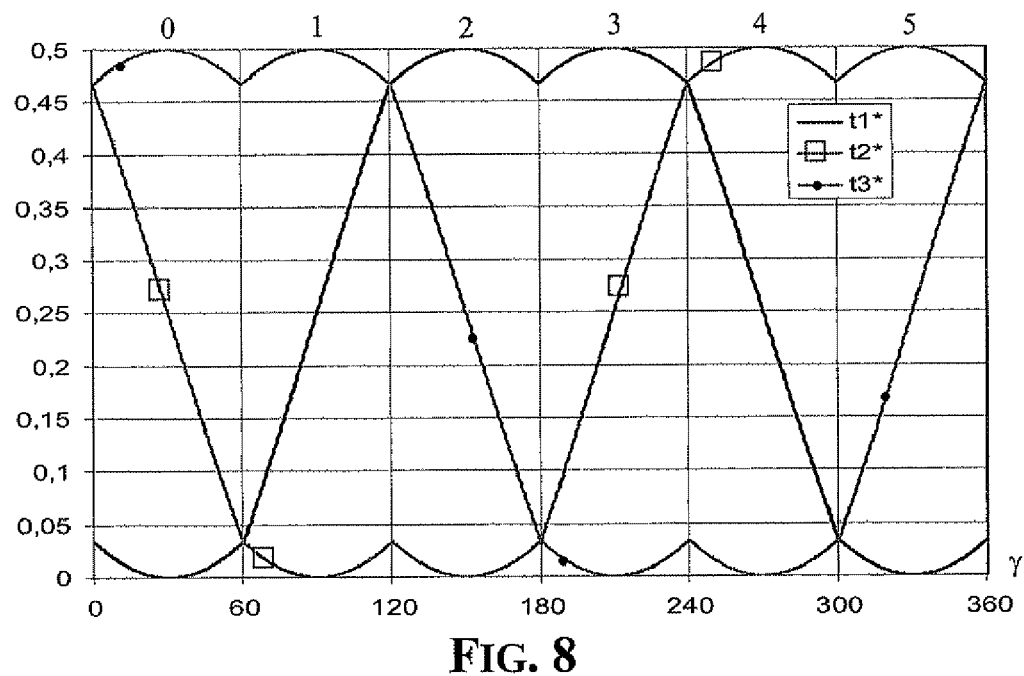
FIG. 8 is a graph representation of the values that must be reconstructed by accessing the look-up table for obtaining the desired Space Vector Modulation in accordance with the invention.

FIG. 8 illustrates the three graph representations of the duty-cycles $t_1$, $t_2$, and $t_3$ as a function of the position of the rotor: they are very similar to each other but for an outphasing of 120°. Instead of storing three distinct waveforms, it is convenient to store only one of them and properly modify the logic circuitry for accessing the look-up table. In this way, instead of three LUTs and a single access, there is only one look-up table that is accessed three times, adding 120° to the initial value of the input value at each access, as indicated in the basic scheme of FIG. 9.

Such an approach does not reduce hardware resources, but significantly reduces the computational load of the sinusoidal control algorithm.

LUT Optimized for Hardware Implementation

Figure 9:
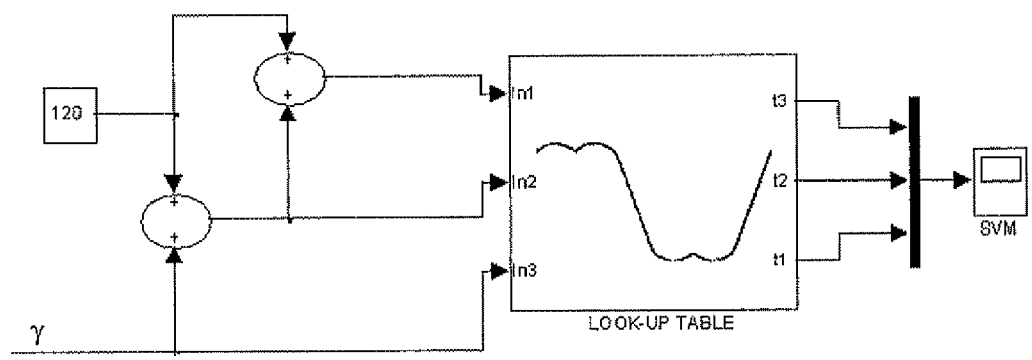
FIG. 9 illustrates how to access a single look-up table for obtaining the desired Space Vector Modulation in accordance with the invention.

As an alternative to the technique for accessing the single LUT illustrated in FIG. 9, it is possible to apply a further reduction of data to be stored in an SVM system, at the cost of making the input logic circuitry more complex.

Figure 10:
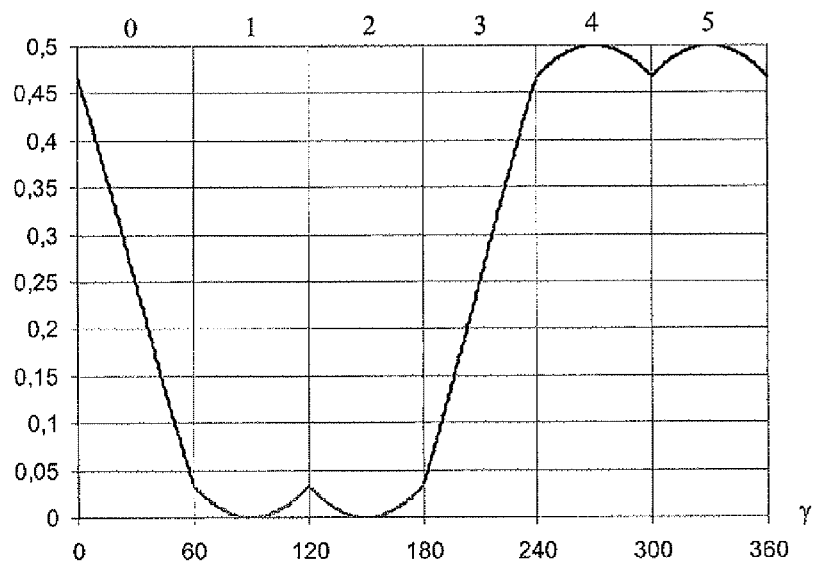
FIG. 10 is a graph representation that highlights the symmetries of the waveforms to be reconstructed by accessing a look-up table in accordance with the invention.

As illustrated in FIG. 10, the waveform to be recorded in the single LUT is symmetrical. The storage requirements may be reduced by storing only the values relative to the sectors 0 and 1, thus obtaining the graph of the waveform for the other sectors by reflection or reversal. For example, the graph in sector 3 may be obtained by reflection of the graph in sector 0, the graph in sector 2 is a replica of that in sector 1, and the graph in sectors 4 and 5 is obtained by reversing the graph in sectors 1 and 2.

Instead of a LUT that stores values of the duty-cycle relative to the whole SVM period, the circuit of this invention, according to a different embodiment (FIG. 13), may include two smaller LUTs both storing values in the range [0°, 60°], that are accessed to read in the right order the stored data for reconstructing the output waveform of FIG. 10.

As stated before, the access logic circuitry to the two LUTs is more complicated because, given an input value γ, it is necessary to determine the sector to which the angle γ belongs. Moreover, it is to be re-scaled in a range [0°, 60°] for obtaining the value for accessing the two tables. The circuit comprises a logic circuitry for reversing and reflecting the outputs of the two LUTs, and a circuit block that assembles the graphs in the different sectors for obtaining the three waveforms of FIG. 8.

Being q0 and q1 are the outputs of the LUTs corresponding to sectors 0 and 1 of FIG. 10, the duty-cycles $t'_1$, $t'_2$, $t'_3$, are determined for the different sectors by the portions of graph indicated in Table 3.

TABLE 3

| Sector | $t_1$* | $t_2$* | $t_3$* |
|---|---|---|---|
| 0 | q1 | q0 | q1 reversed |
| 1 | q0 reflected | q1 | q1 reversed |
| 2 | q1 reversed | q1 | q0 |
| 3 | q1 reversed | q0 reflected | q1 |
| 4 | q0 | q1 reversed | q1 |
| 5 | q1 | q1 reversed | q0 reflected |

Figure 11:
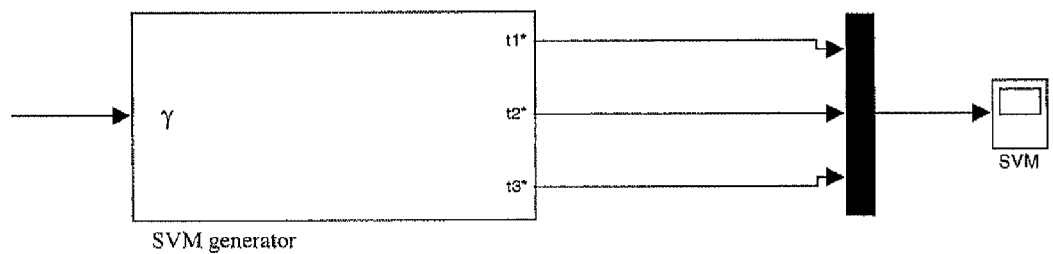
FIG. 11 depicts a generic block that generates driving signals of a final power stage for carrying out a Space Vector Modulation in accordance with the invention.

In terms of a function of a certain input angle γ, the block of FIG. 11 generates the three values that, once processed, determine the duty-cycles of the high-side of the inverter, according to the graphs depicted in FIG. 8.

Identification of the Sector

If the angular position is represented by unsigned integer numbers in the range [0, 768] corresponding to [0°, 360°], each sector corresponds to the range [0, 127]. It is particularly convenient to represent each angle γ in the interval [0, 768], that is with an unsigned string of ten bits, because with this expedient, a good resolution is attained and it is much easier to identify in which of the six angular sectors of 60° the angle of the phasor that represents the triplet of voltages to be applied is comprised. Considering the unsigned binary representation of the angle γ, depicted in Table 4, for any value of γ, the three most significant bits correspond exactly to the binary coding of the number of the sector to which the angle γ belongs, while the other seven bits correspond to the same angle scaled in a range [0°, 60°].

TABLE 4

| Angle γ (degrees) | Decimal representation | Binary representation |
|---|---|---|
| 0 | 0 | 0000000000 |
| 60 | 128 | 0010000000 |
| 120 | 256 | 0100000000 |
| 180 | 384 | 0110000000 |
| 240 | 512 | 1000000000 |
| 300 | 640 | 1010000000 |

Figure 12:
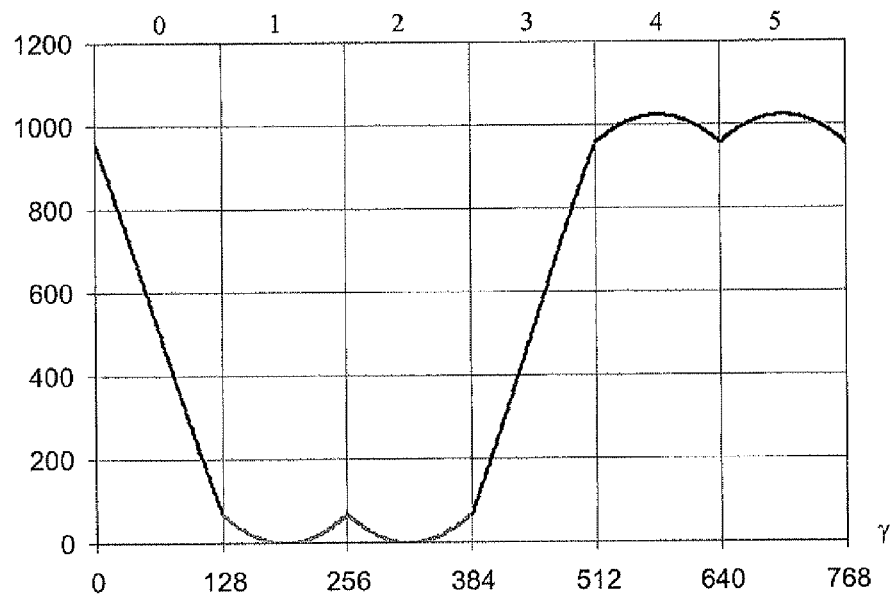
FIG. 12 illustrates a SVM waveform represented through digital values with 10 bits in accordance with the invention.

Supposing that γ be equal to $(448)_{10}$ in decimal representation, it corresponds to 210° electrical degrees, thus, as depicted in FIG. 12, it is comprised in sector 3.

By scaling the angle γ in sector 3, it is 210°−180°=30°.

| Position | Representation | Sector | Rescaled angle | Relative position |
|---|---|---|---|---|
| 210° | $(448)_{10}$ = $(0111000000)_2$ | $(011)_2$ = $(3)_{10}$ | $(1000000)_2$ = $(64)_{10}$ | 30° |

Representing the angle γ with an integer number comprised in the range [0, 768], the logic for recognizing the sector and the rescaled angle $γ-γ_k$, implies an extremely small computational burden and relatively simple hardware resources.

Compression and Reconstruction

The outputs q0 and q1 of the two look-up tables relative to sectors 0 and 1 are represented with ten bits in a range $t_i \in [0, 1023]$. Thus, the stored values in the LUTs are those represented in FIG. 12.

The unsigned representation with ten bits of the waveforms q0 and q1 allows reversal of the waveforms with a minimum requisite of hardware resources. Having stored the curve in sector 1, the desired waveform in sectors 4 and 5 is obtained by negating the output bits of the look-up table q1, as shown in Table 5:

TABLE 5

| Decimal value sector 1 | Binary representation | Decimal value sector 4 | Binary representation |
|---|---|---|---|
| 68 | 0001000100 | 955 | 1110111011 |
| 66 | 0001000010 | 957 | 1110110101 |
| 64 | 0001000000 | 959 | 1110111111 |
| 62 | 0000111110 | 961 | 1111000001 |
| 60 | 0000111100 | 963 | 1111000011 |

Figure 13:
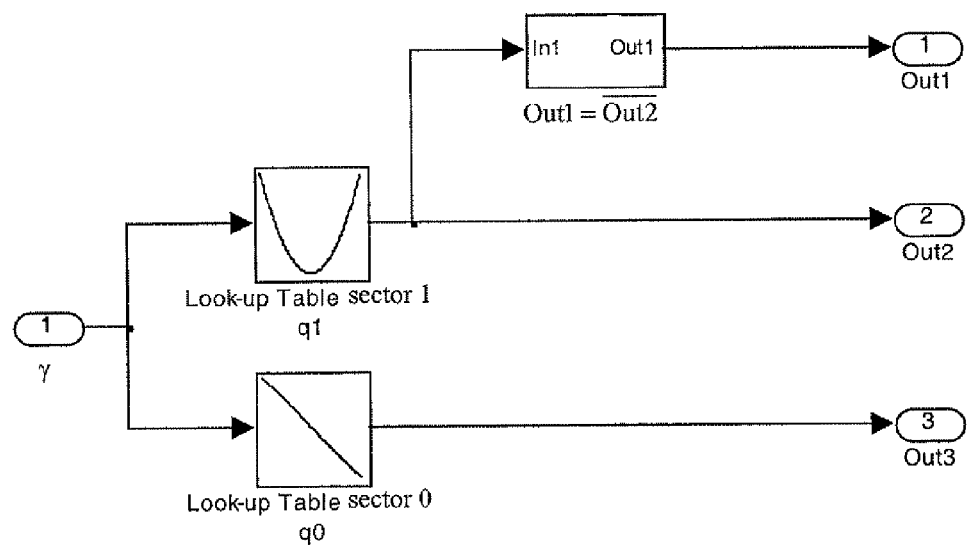
FIG. 13 illustrates a circuit according to the present invention for obtaining portions of the waveform of FIG. 12 by accessing to two look-up tables each storing the respective values to a respective angular sector of 60 degrees.

A circuit diagram capable of executing this operation is illustrated in FIG. 13. By storing only the portions of curve in the sectors 0 and 1, it is possible to obtain, with few simple operations, the waveforms in the other sectors.

A technique for reflecting the portion of the waveform q0 stored in the LUT relative to sector 0 is presented hereinafter. This operation is necessary when, for example, given the waveform in sector 0, it is necessary to obtain the waveform in sector 3.

Looking at FIG. 8, it may be noted that, given the data stored in the LUT, q0, the output of the LUT itself must be delivered if the identification number of the sector is even, otherwise a reflected replica thereof must be output in the opposite case.

Figure 14:
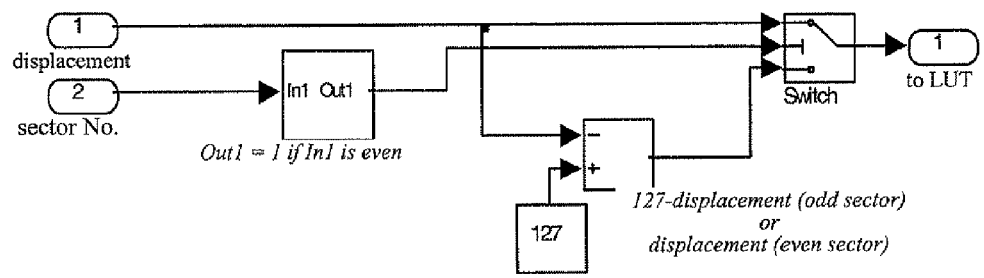
FIG. 14 depicts how to generate a waveform that is a reflected replica of a waveform stored in a look-up table in accordance with the invention.

A circuit for implementing this operation is illustrated in FIG. 14.

If the number of the sector is even, then the LUT is accessed directly with the re-scaled angle. If the sector is odd, the LUT is accessed with the complement to 60° of the input angle. According to the representation used so far, this is obtained by subtracting the value 127 from the input integer number that represents the current angular position.

Figure 15:
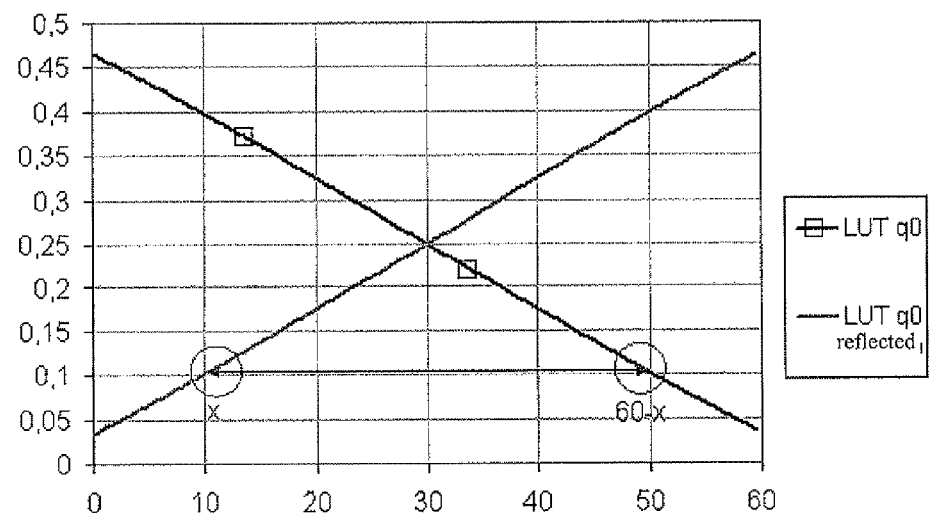
FIG. 15 depicts a waveform that is a reflected replica of a waveform relative to the second q0 in accordance with the invention.

FIG. 15 depicts, from a graphical point of view, how a reflected replica of the waveform q0 is obtained. With the illustrated example of implementation, each time the identification number of the sector associated to a certain input angle is odd, a reflection is performed not only on the waveform of the sector 0, of FIG. 10, but also on the waveforms of the sectors 1 and 4.

Moreover the latter waveforms are invariant by reflection. Thus, any additional control may not be necessary, and this contributes to the reduction of hardware resources required for realizing the SVM driving circuit.

Rescaling

The waveform of FIG. 12 does not allow optimal control of the inverter because the triangular modulating signal oscillates between 0 and 0.5. In order to better understand this problem, the graph is scaled to a unitary value, the period of the PWM signals is considered equal to an arbitrary unit (FIG. 16).

The threshold values to be compared with the triangular modulation signal, for generating the switching pattern to be applied to the high-side switches of the inverter, are obtained by multiplying the values assumed by the waveforms for a certain value such to control the motor in the desired manner (this algorithm relates to control techniques and is not part of this invention). With the configuration of FIG. 16, such a value ranges within [0, 0.5] because the triangular modulating signal varies between 0 and 0.5. Referring to the example of FIG. 17a, since the maximum value reached by the modulating signal is 0.5, if the output of the control was such that, when multiplied by the SVM, a value larger than 0.5 is obtained, and there would be no modulation at all. This is the so-called "overmodulation condition".

Figure 16:
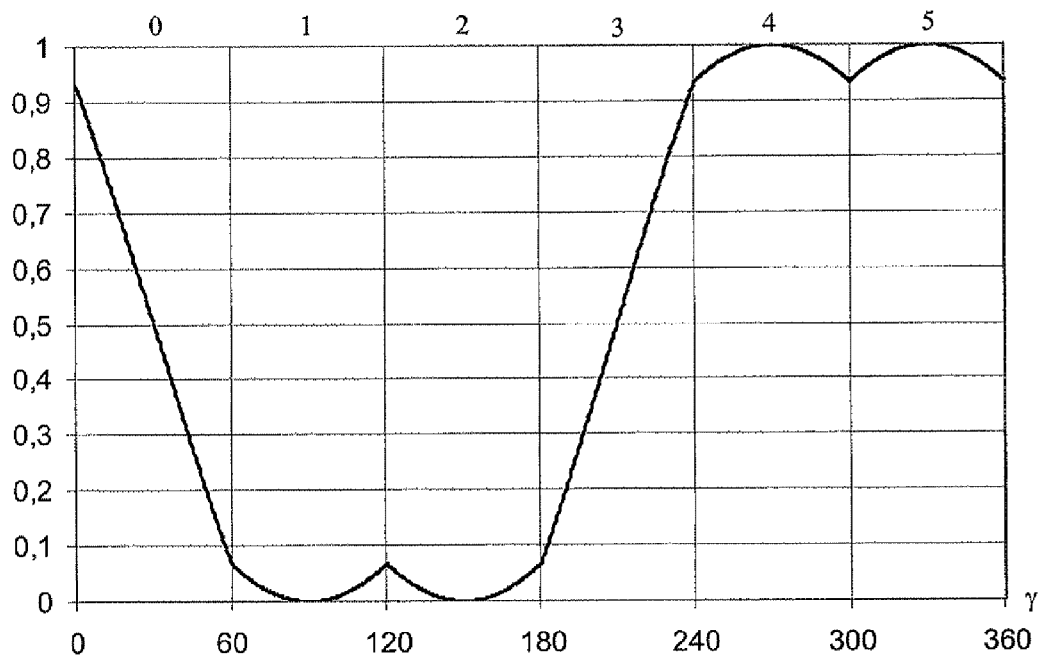
FIG. 16 depicts the waveform to be generated for the SVM driving scaled in a unitary range in accordance with the invention.
Figure 17A:
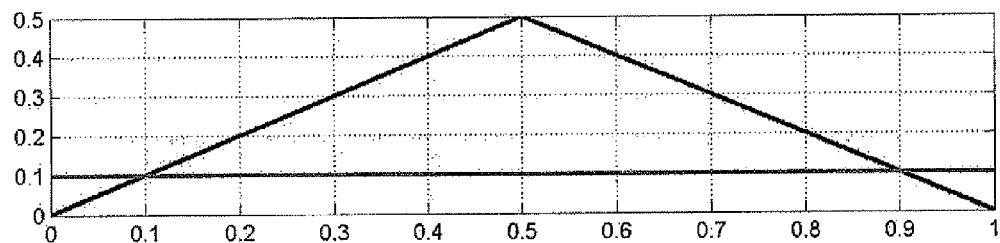
FIGS. 17a to 17c illustrate driving signals of the high-side and of the low-side of the final power stage for generating the waveform of FIG. 12.
Figure 17B:
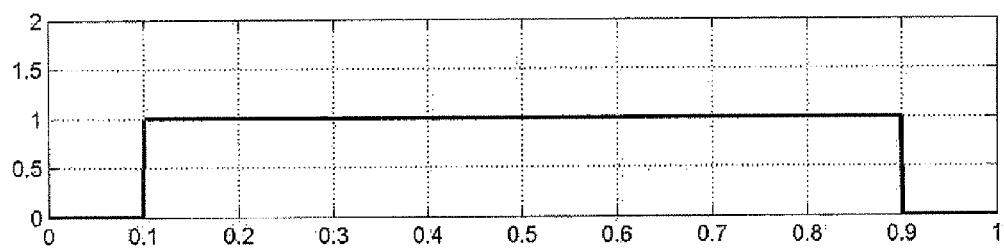
Figure 17C:
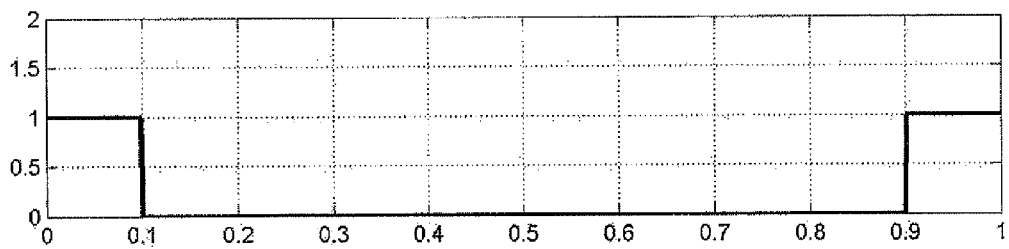

The fact that the SVM of FIG. 16 is not optimized may be better understood by considering the case in which the product between the output of the PI and of the SVM block is 0.1. In this case, as evident from FIGS. 17b and 17c, the high-side switches and the low-side switches are driven in a strongly asymmetrical manner, with the high-side switches turned on for 90% of the period and the low-side switches turned on for only 10% of the period.

This condition should be avoided because it overheats one switch of the inverter, with a consequent modification of the transfer characteristics and an asymmetric functioning of the inverter itself. Another problem, due to the fact that the high-side switches heat up more than the low-side ones, is that it is necessary to have a heat sink larger than would be sufficient should the switches of the inverter function symmetrically, because the heat sink must be dimensioned for the switches that heat up the most.

Figure 18:
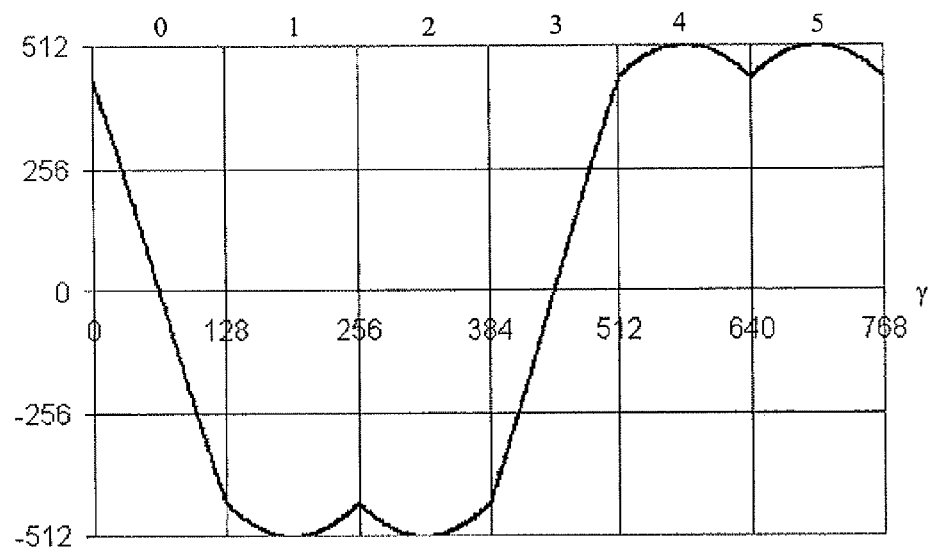
FIG. 18 depicts the waveform of FIG. 12 scaled in a range centered around zero.
Figure 19:
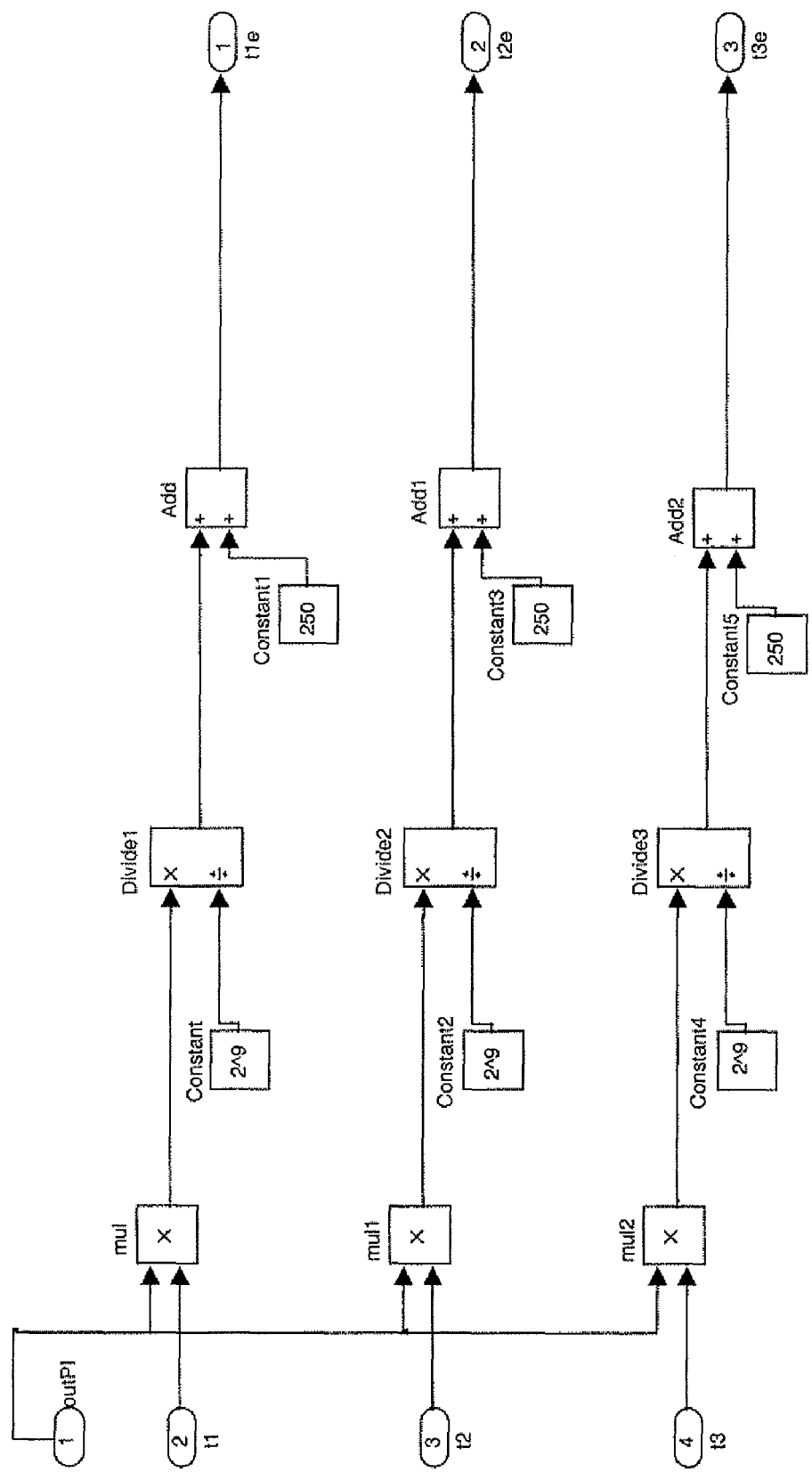
FIG. 19 depicts a circuit for generating the waveform of FIG. 12 thus making the final stage generate the output of FIG. 18.

For solving this problem, it is convenient to shift down the waveform in FIG. 12 to make it symmetrical about the zero, as depicted in FIG. 18. This is done by a dedicated logic circuit (FIG. 19). The outputs of the SVM block are processed again as shown in FIG. 19 for calculating the effective values t1e, t2e, and t3e of the duty cycles of the high-side of the inverter. After having multiplied by the output value ouTPI of the standard proportional-integral controller that determines the proportional-integral control action of the motor, the obtained values are divided by 512 to have values comprised between [−1, 1]. Then, a value equal to 0.25 times the PWM period is added.

The reason for dividing by the maximum of the adopted representation for the SVM after having multiplied by the output of the controller, is that the characteristic waveform of the SVM should be represented in the range [−1, 1]. However, in a binary representation, for not losing precision, it is preferable to associate the value −1 to the number 512 and the value +1 to the number 511. This is why it is advantageous to carry out the rescaling operation only after the multiplication, when all the decimal ciphers have been used for correctly calculating the result.

Figure 20:
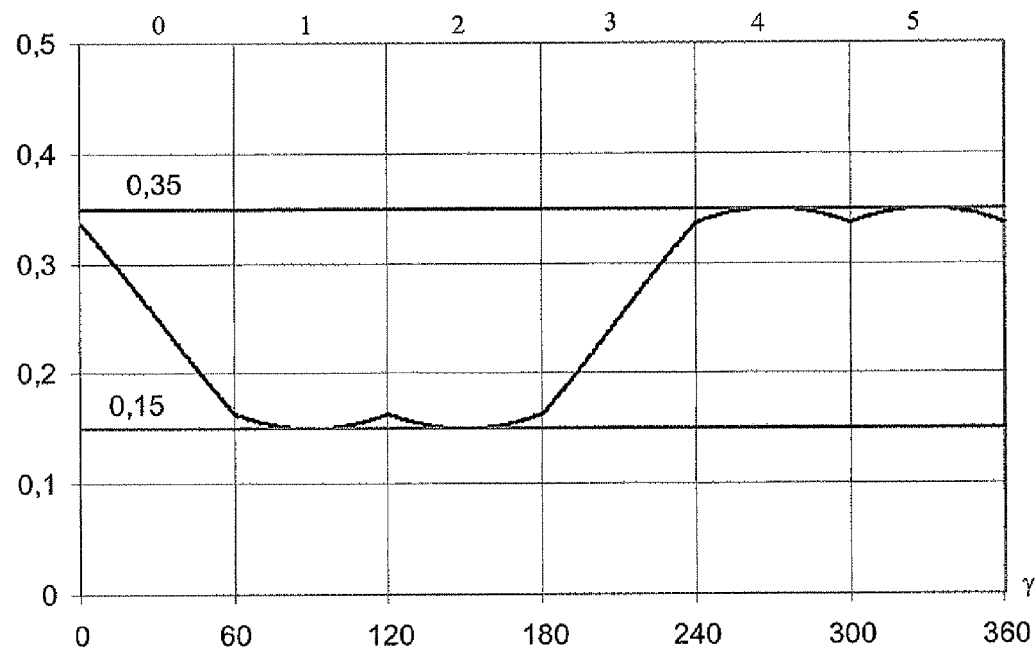
FIG. 20 depicts the waveform of FIG. 12 scaled between 0.15 and 0.35.

Supposing once again, normalizing all to a unitary value, considering the period of the PWM equal to 1 arbitrary unit, having the controller output ouTPI equal to 0.1, by properly rescaling the graph of FIG. 18, and eventually after having summed an offset value of 0.25 times the PWM period, the graph of FIG. 20 is obtained.

Figure 21A:
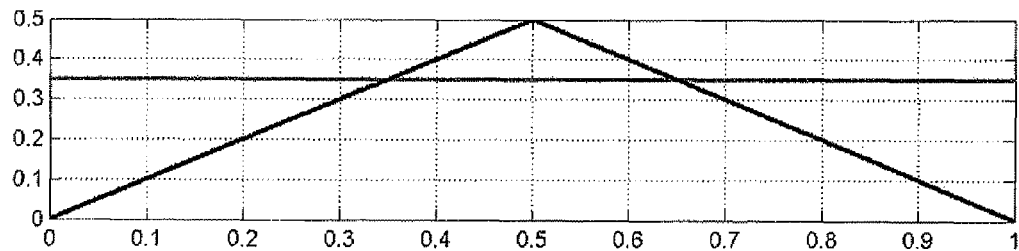
FIGS. 21a to 21c illustrate, respectively, how to generate from a modulation signal the respective PWM driving signals for the high-side and the low-side of the inverter, for generating the waveform of FIG. 20.
Figure 21B:
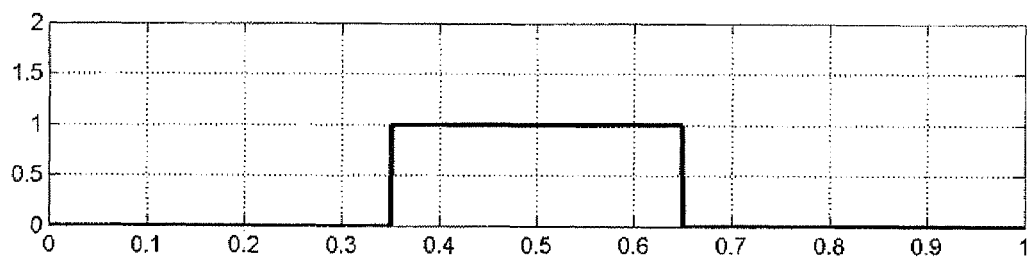
Figure 21C:
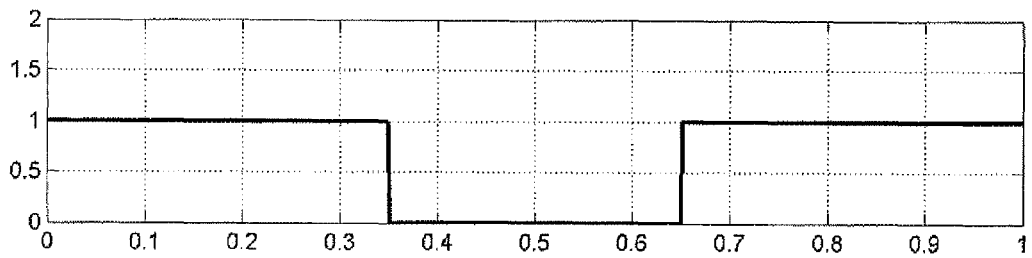

Even if the same functioning conditions in which the pattern of FIG. 17 has been obtained occur, by carrying out a resealing operation, a new driving configuration, depicted in FIG. 21, is obtained. It is evident that the high-side and the low-side of the inverter are used symmetrically.

Figure 22:
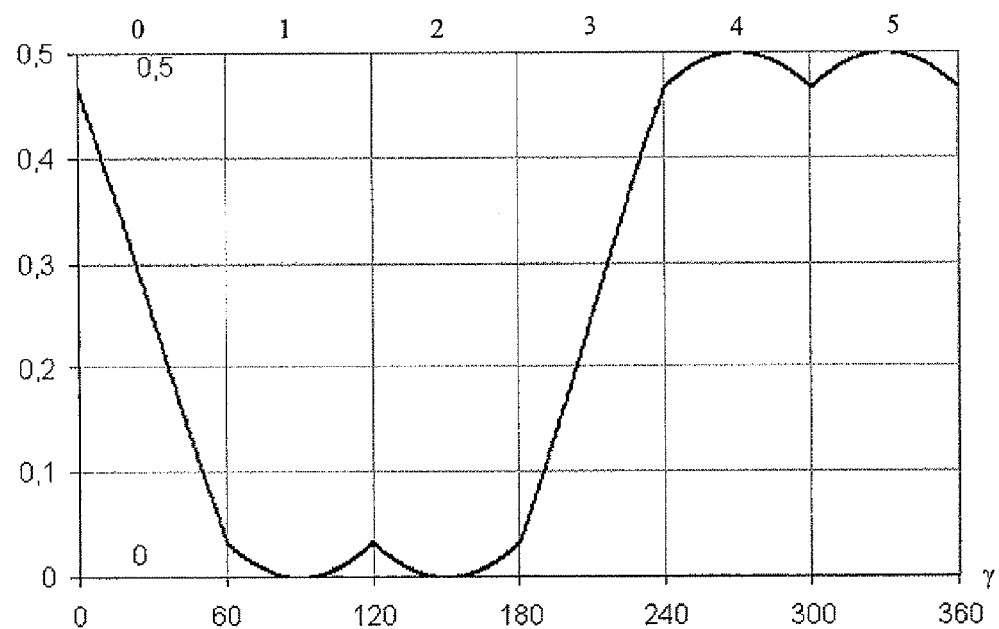
FIG. 22 depicts a waveform analogous to that of FIG. 12 scaled in the range 0-0.5.

It must be noticed that, through similar observations, it may be inferred that the overmodulation condition is avoided if the output of the controller is at most equal to ±0.25 times the PWM period. As shown in FIG. 22, in this case, the limit is reached because the peak of the curve is equal to the maximum value assumed by the carrier.

Further Compression Technique

By analyzing FIG. 12 more carefully, it has been noticed that it is possible to further reduce the information to be stored.

There is a further symmetry that would allow storage of the values assumed by the curve only in two ranges of 30° each, instead of two ranges of 60°, thus halving, for the same resolution, the number of values to be stored. To achieve this, it is advantageous to modify the way with which the system manages the inputs and the outputs of the LUTs.

Figure 23:
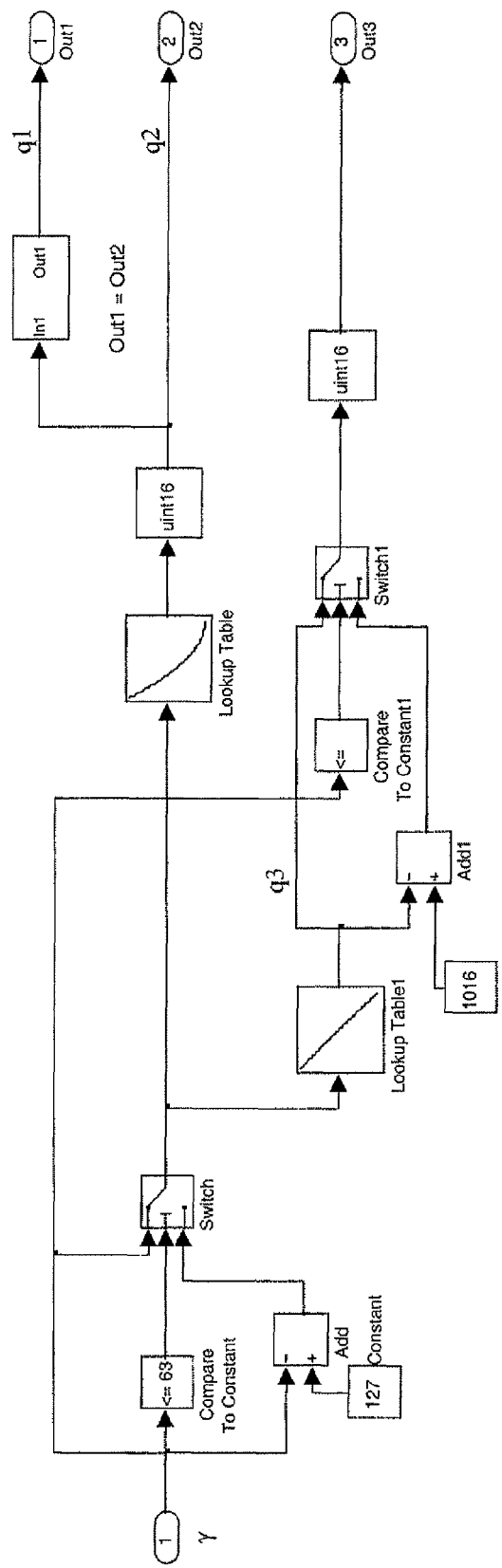
FIG. 23 depicts a circuit of this invention for generating a waveform similar to that of FIG. 18.

Instead of the circuit of FIG. 13, that contemplates a direct access to LUTs that store waveforms of [0°, 60°] sectors, according to the preferred embodiment of this invention, the circuit of FIG. 23 is used.

In this circuit, the LUTs store the waveforms of just [0°, 30°] sectors and the input is modified before accessing the tables. If the angle γ, in the adopted representation, is smaller than or equal to the integer value 63, then the table is directly accessed, otherwise the input value is complemented to 127, and this value is used for accessing the table.

For the outputs q1 and q2 no post-processing of data is necessary. By contrast, for the output q3 it is to discriminate between the case in which a direct access to the table has been made, and the case in which the input angle is larger than 30°. In the second case, for the representation that is being used in these examples, it is necessary to output the value 1016−q3.

Figure 24A:
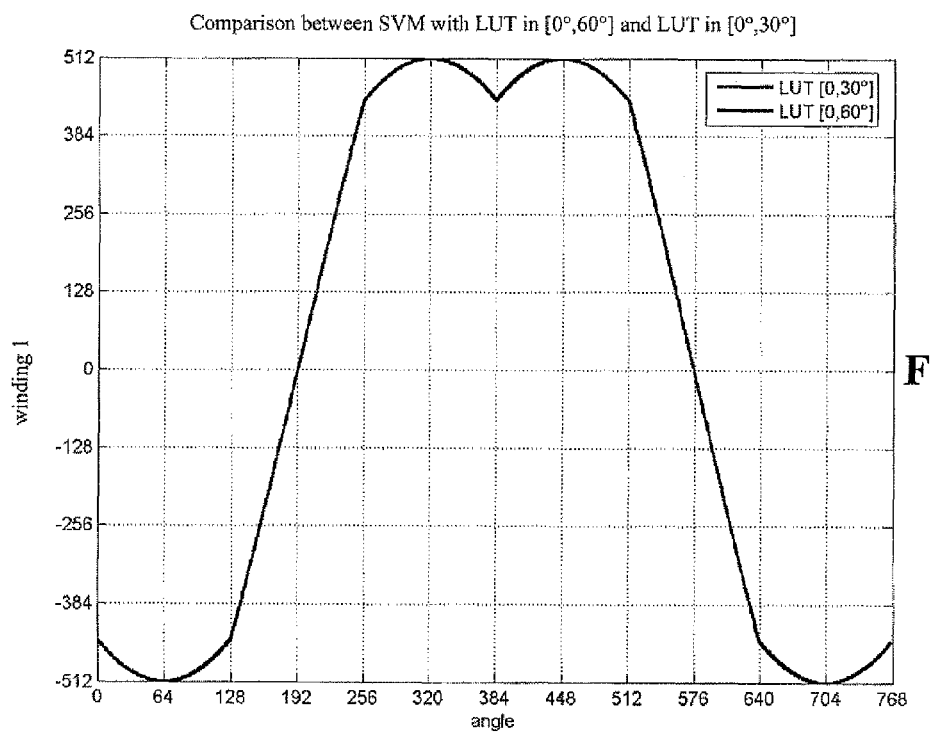
FIGS. 24a to 24c depict waveforms obtained with the circuit of FIG. 23.
Figure 24B:
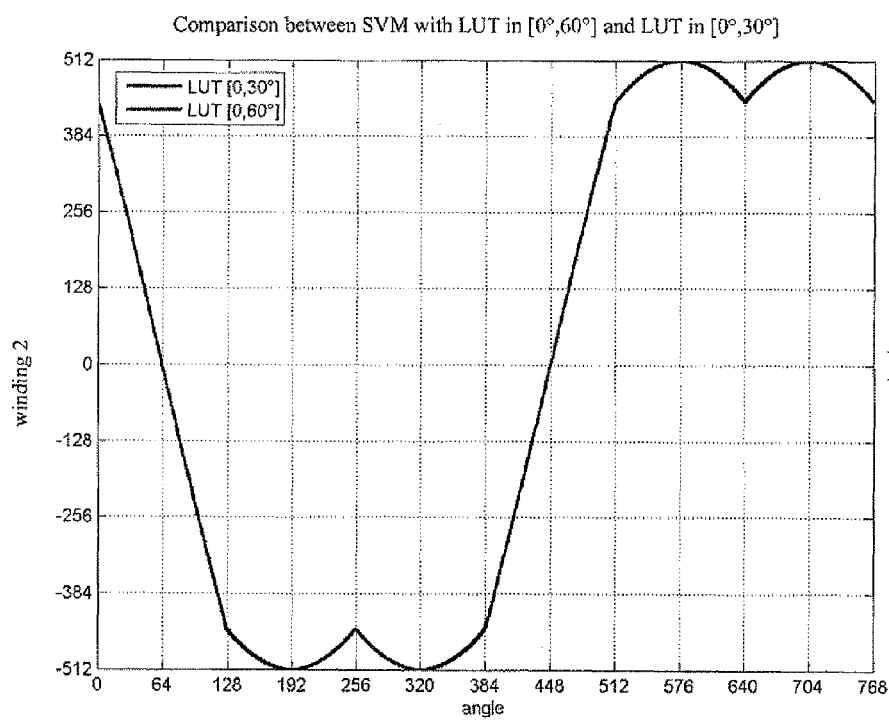
Figure 24C:
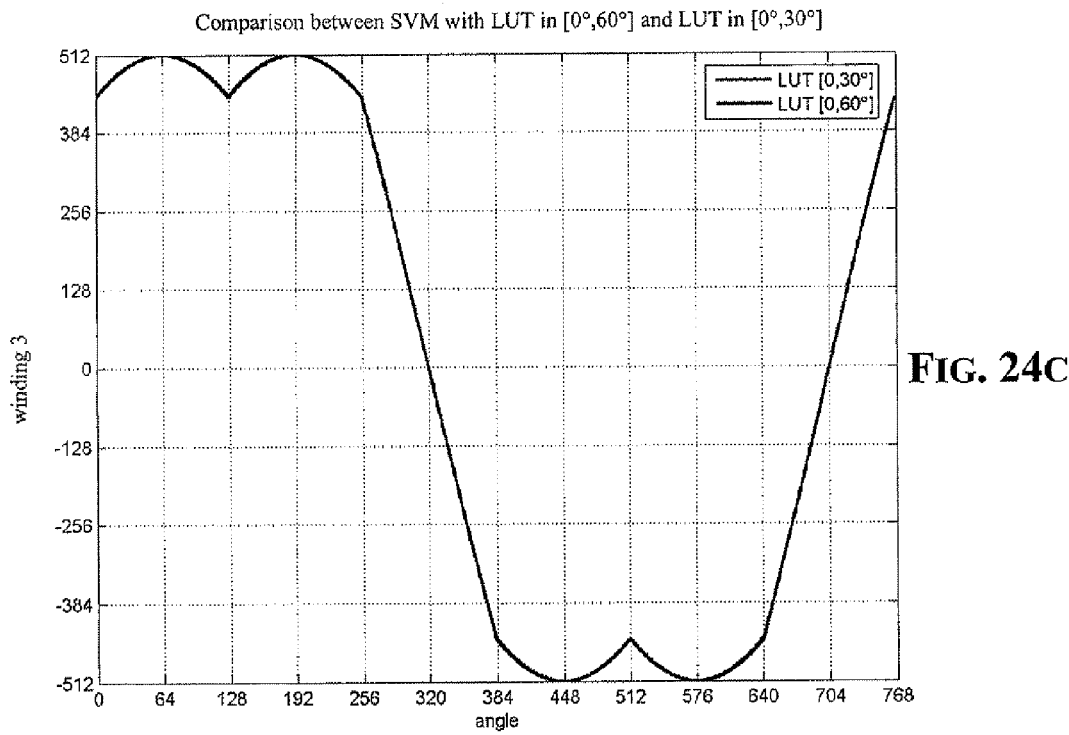

The obtained results are compared in FIG. 24 with those of the circuit of FIG. 13. The desired waveforms are tracked with good precision and the slight mismatch is tolerable and largely compensated by the reduction of required memory resources.

Hardware Implementation of the SVM

A VHDL embodiment of the hardware that implements the Space Vector Modulation is very similar to the Simulink embodiment illustrated hereinbefore, because it is substantially combinatory logic. In the RTL description of the hardware architecture, it is possible to notice how, with a single component, all three waveforms are realized, using their symmetries and analogies.

According to what has been stated hereinbefore, three waveforms with a representation comprised in the interval [0, 1023] are generated. Only in a second step a translation of the mean value for optimizing the power dissipation on the MOS of the inverter is executed.

Figure 25:
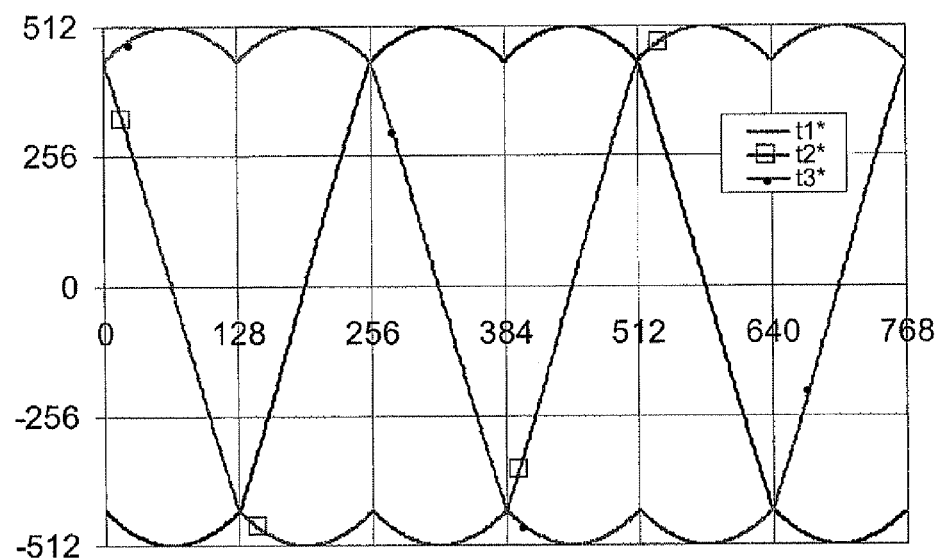
FIG. 25 is a graph representation of the three waveforms to be generated in accordance with the invention.
Figure 26:
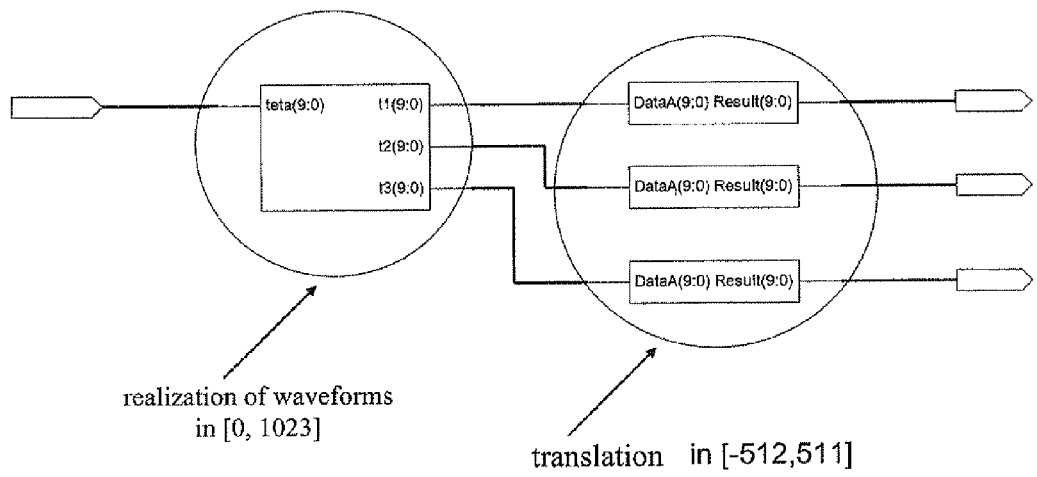
FIG. 26 is a RTL description of a circuit of this invention for generating the waveforms of FIG. 25.
Figure 27:
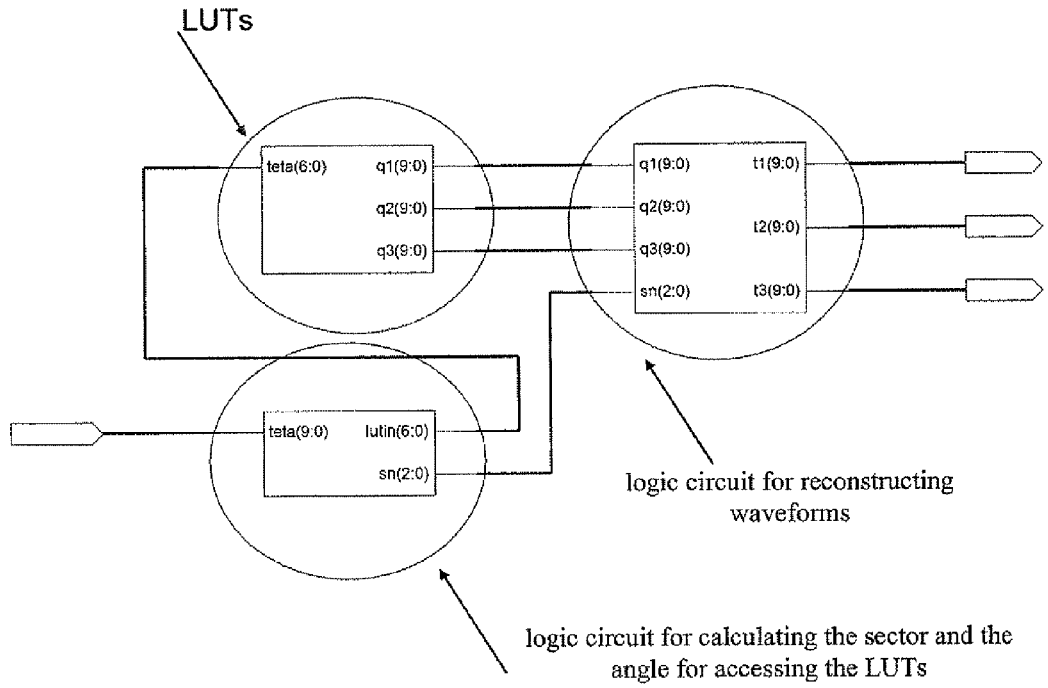
FIG. 27 is a RTL description of the upstream block depicted in FIG. 26.
Figure 28:
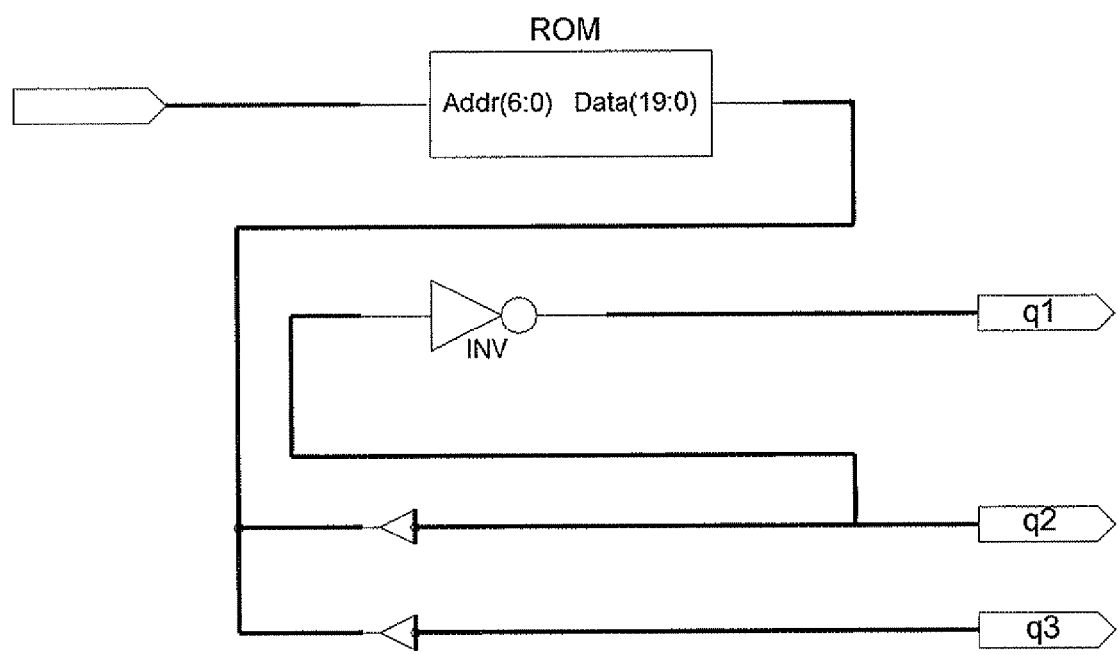
FIG. 28 is a RTL description of the block LUTs represented in FIG. 27.
Figure 29:
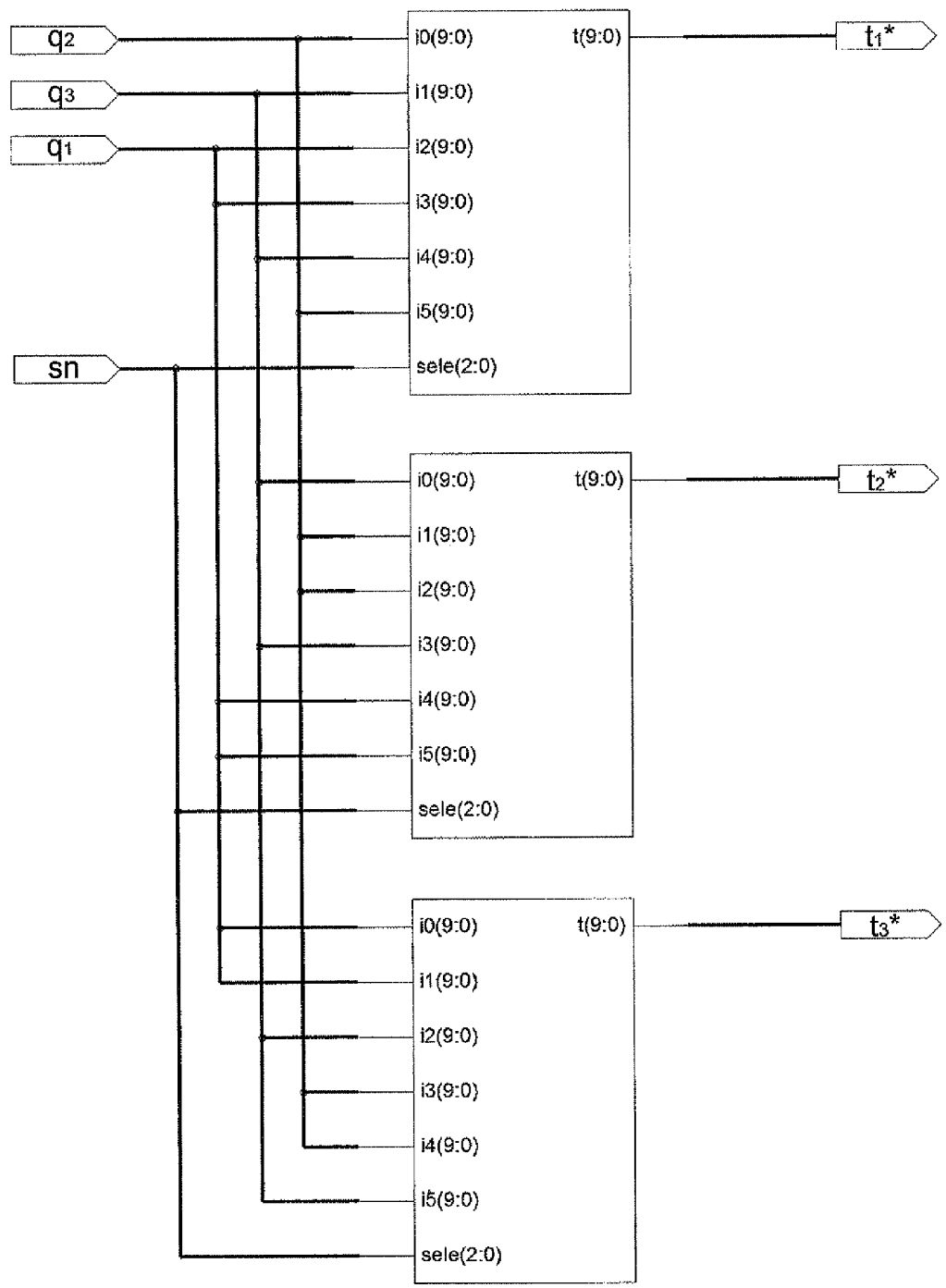
FIG. 29 is a RTL description of the block downstream depicted in FIG. 27.

Two LUTs and logic circuitry for modifying the input and output signals are used for realizing the three waveforms of FIG. 25. In the upstream block of FIG. 26, the input signal is conditioned for application of the compression algorithm by isolating the value of the sector to which the angle belongs, and by calculating the re-scaled replica in the range [0°, 60°]. The three output values from the LUTs are properly addressed on the three outputs of the block. Detailed Simulink representations of the circuit according to the preferred embodiment are depicted in FIGS. 27, 28, and 29.

Of the 10 bits of the input angle, the three most significant bits (MSB) represent the sector, for which the effective angle with which the LUT is accessed. The effective angle varies in range [0, 127], and may be represented with 7 bits. There is a 7 bit input and three outputs with 10 bits. Thus 384 points are to be stored. As already noticed, the total number of points to be stored may be reduced to 256, because the output of the first LUT may be obtained by inverting each bit of the output of the second LUT.

The hardware stores 128 samples at 20 bits, and from these samples it generates the outputs (256 samples at 10 bits) by discriminating the 10 most significant bits (MSB) and the 10 least significant bits (LSB) of the stored data. The ROM has the following characteristics:

| Instance Size | 128 |
|---|---|
| Instance Type | ROM |
| Instance Width | 20 |

The total dimension of the ROM, and thus the required storage capacity of the memory, is $$\frac{Size \cdot Width}{8} = \frac{128 \cdot 20}{8} = 320 \text{ bytes.}$$

After having generated the output signals from the LUTs, it is necessary to again assemble the various graphs according to the sequence in Table 6.

TABLE 6

| Sector | $t_1^*$ | $t_2^*$ | $t_3^*$ |
|---|---|---|---|
| 0 | q1 | q0 | q1 reversed |
| 1 | q0 reflected | q1 | q1 reversed |
| 2 | q1 reversed | q1 | q0 |
| 3 | q2 reversed | q0 reflected | q1 |
| 4 | q0 | q1 reversed | q1 |
| 5 | q1 | q1 reversed | q0 reflected |

Figure 30A:
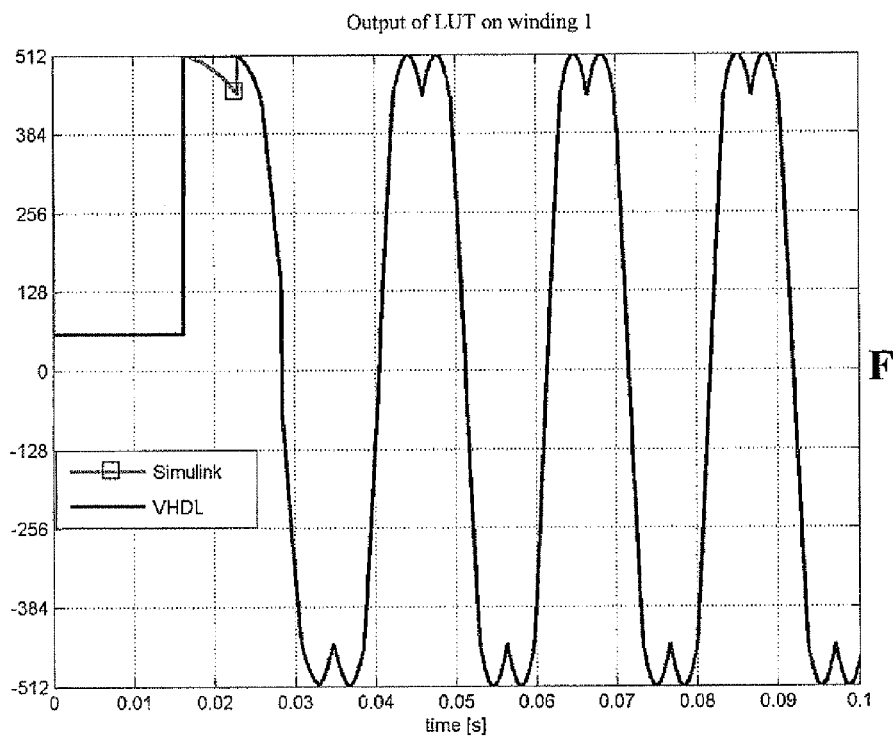
FIGS. 30a to 30c are graph representation of comparisons of results of VHDL and Simulink simulations of the circuit of this invention.
Figure 30B:
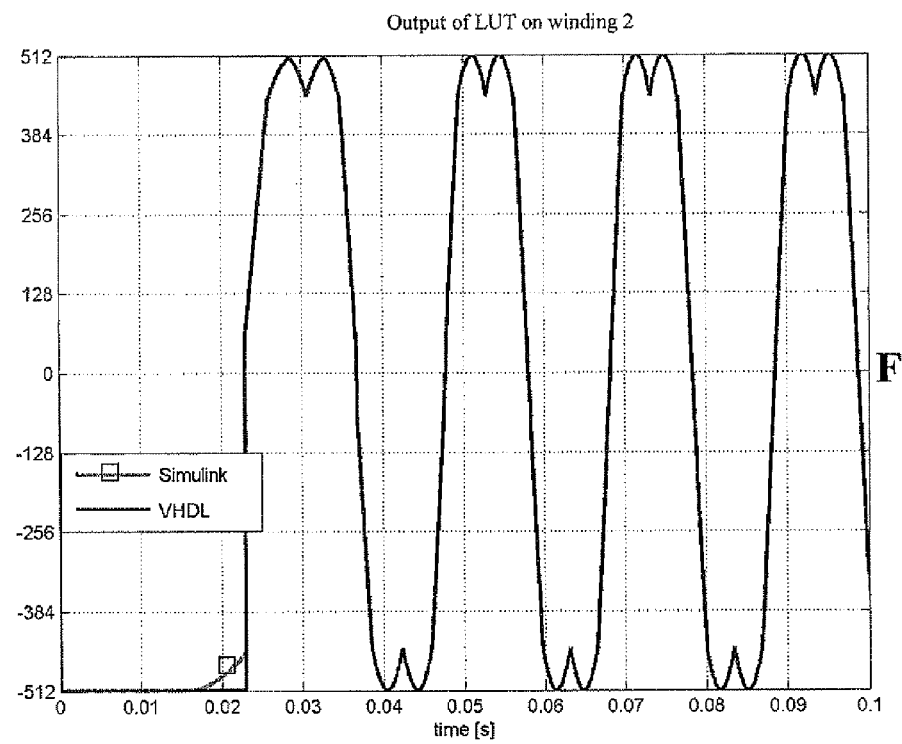
Figure 30C:
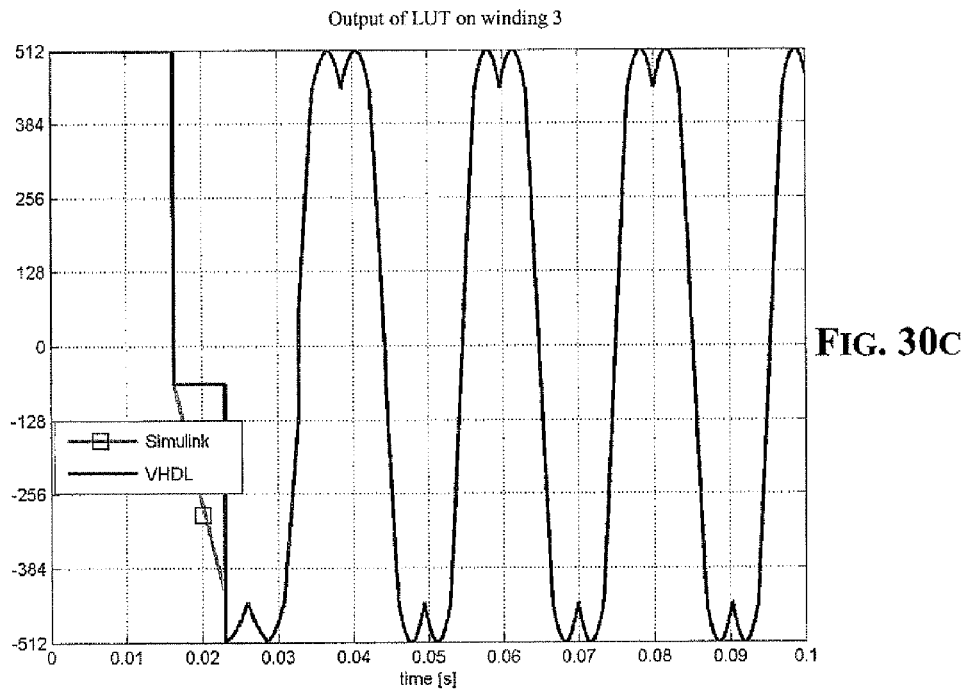

The device generates the waveforms depicted in FIG. 29 through multiplexers, the selection signals of which correspond to the number of the sector. This hardware may be realized with 1377 equivalent gates. FIG. 30 compares the output responses of the SVM blocks realized with Simulink and with a VHDL to a step input applied in a control system that uses the disclosed SVM technique. After a transient, the outputs correspond exactly to those generated in a Simulink simulation.

Optimization of the VHDL Compression

A first technique of reduction (compression) of the data to be stored in the LUTs contemplates direct access to the LUTs that store waveforms of two whole sectors. By reducing the number of values to be stored in the LUTs, as illustrated in the preferred embodiment of this invention, the ROM memory space of the hardware is halved, but the combinatory logic circuitry for managing the ROM is more complex. The trade-off is between a larger ROM on a more complex logic address circuit for accessing the memory.

In this second case, the used ROM has the following characteristics:

| Instance Size | 64 |
|---|---|
| Instance Type | ROM |
| Instance Width | 20 |

The total storage capacity of the ROM is $$\frac{Size \cdot Width}{8} = \frac{64 \cdot 20}{8} = 160 \text{ bytes.}$$

Figure 31A:
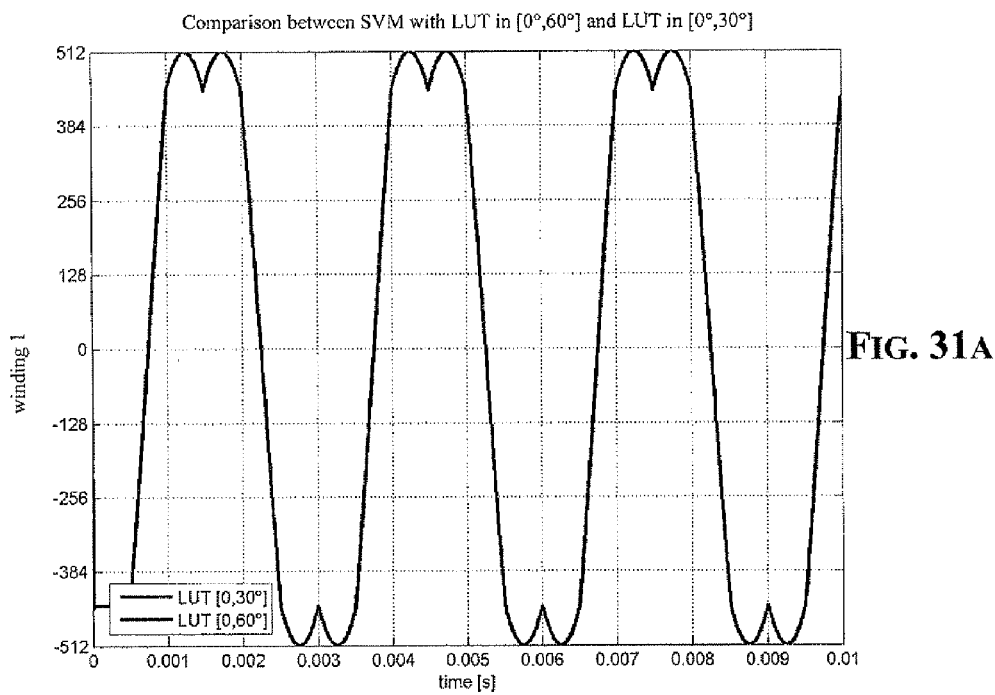
FIGS. 31a to 31c are comparison graph representations of the results of the VHDL simulations of the circuits of this invention in the case in which the look-up table stores the value of two adjacent sectors of 60° or the values of two sectors of 30° in accordance with the invention.
Figure 31B:
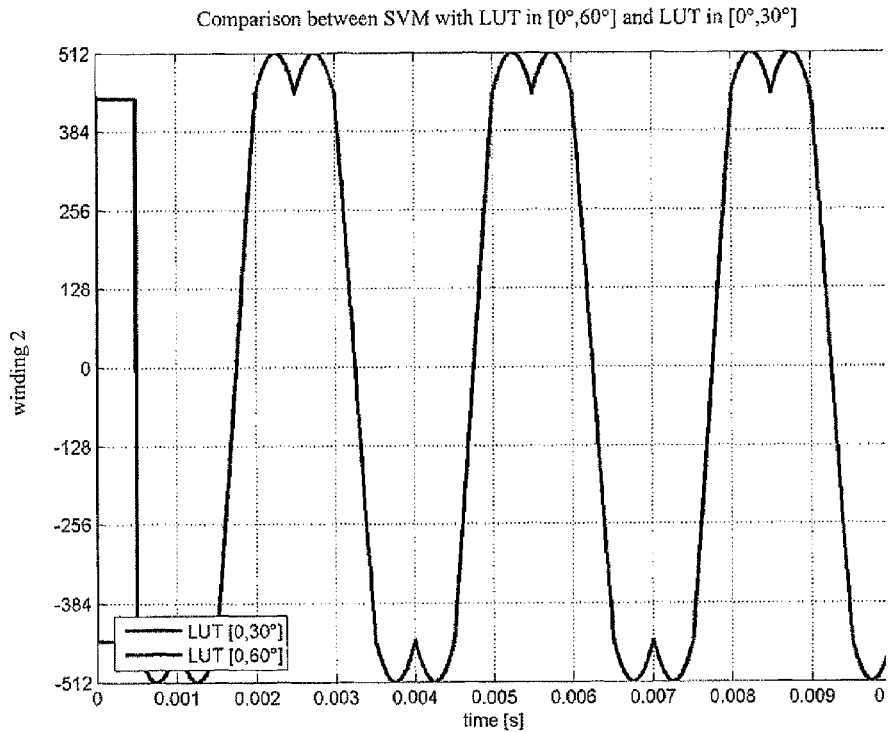
Figure 31C:
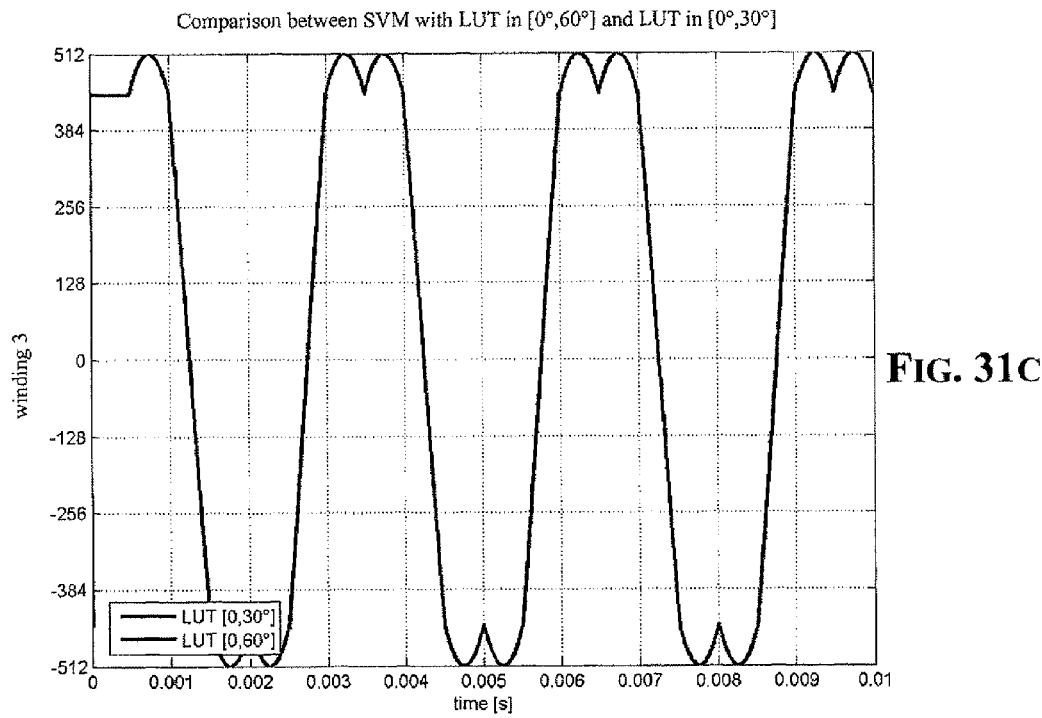

By looking at the following table of the used FPGA resources, it may be noticed that there is a reduction of logic resources. The former approach required 93 slices and 184 LUTs with 4 inputs, and thus, a total of 1377 equivalent gates. The latter approach 80 slices and 157 LUTs with 4 inputs, and thus, a total of 1101 equivalent gates. Therefore, the second technique for reducing the data to be stored is more advantageous. FIG. 31 compares the waveforms obtained storing the data in a whole sector, with a ROM of 320 bytes obtained by storing only the data in half a sector, with ROMs of 160 bytes. The two waveforms practically coincide.

| Device Utilization Summary | | | |
|---|---|---|---|
| Logic Utilization | Used | Available | Utilization |
| Number of four input LUTs | 157 | 1,536 | 10% |
| Logic Distribution | | | |
| Number of occupied Slices | 80 | 768 | 10% |
| Number of Slices containing only related logic | 80 | 80 | 100% |

-continued

Device Utilization Summary

| Logic Utilization | Used | Available | Utilization |
|---|---|---|---|
| Number of Slices containing unrelated logic | 0 | 80 | 0% |
| Total number of four input LUTs | 157 | 1,536 | 10% |
| Number of bonded IOBs | 40 | 92 | 43% |
| Total equivalent gate count for design | 1,101 | | |
| Additional JTAG gate count for IOBs | 1,920 | | |

Considering the results of the tests, it is possible to state the proposed algorithm, with a reduction (compression) of data to be stored, functions correctly, and its performances are very good, notwithstanding the sensible reduction of the complexity and the required hardware resources for implementing it. The methods and architectures of this invention have also the following advantages: reduction of requirements of hardware resources; possibility of a completely digital hardware implementation of a widely used modulation technique that is regarded as very onerous for a microcontroller or DSP; and excellent control of the inverter that allows to reach optimal performance both in terms of efficiency of the inverter and dynamic behavior of the controlled multi-phase electric machine.

That which is claimed:

1. A method for determining duty-cycles of respective pulse width modulated (PWM), space vector modulated (SVM) control signals of an inverter with half-bridge switching stages, each half-bridge switching stage controlling a multi-phase motor including a plurality of windings to apply thereto a respective sinusoidal voltage of a period equal to an SVM control period, comprising:
    storing values of the duty-cycles established as a function of a position of a rotor of the multi-phase motor in at least one look-up table;
    determining for each SVM control period an angle of a phasor that represents a multiple of sinusoidal voltages to be applied to the multi-phase motor; and
    determining the duty-cycles as a function of the angle to apply the respective sinusoidal voltages of the multiple to the respective windings of the multi-phase motor;
    wherein storing comprises storing in the at least one look-up table values of two pre-established waveforms relative to at least one of the duty-cycles as a function of the angle in at least two angular sectors of 60° degrees each by at least
        identifying which of six angular sectors of 60° the angle belongs to,
        calculating a difference between the angle and a lower bound of the identified angular sector, and
        generating values of each of the duty-cycles as a function of the identified angular sector of the difference and of the values of the two pre-established waveforms stored in the at least one look-up table.

2. The method of claim 1, wherein storing further comprises storing the at least one look-up table values of two different pre-established waveforms relative to one of the duty-cycles for values of the angle comprising two distinct intervals of 30° each, and further comprising:
    generating values of the duty-cycles as a function of the difference and the identified angular sector of 60° to which the angle belongs, by at least
        reading values from the look-up table related to a first or a second waveform in correspondence of the difference or of a complement thereof to 60°, and
        generating values of the duty-cycles equal to read values or to a complement to a maximum value of the duty-cycles.

3. The method of claim 2, further comprising representing the values stored in the look-up table through an unsigned bit-string and obtaining a complement to a maximum value by inverting each bit of the bit-string.

4. The method of claim 3, further comprising:
    generating the PWM control signals by comparing a triangular modulating signal with a threshold level, the threshold level being obtained by at least
        reading bit-strings of data representing the duty-cycles from the look-up table,
        subtracting half of the maximum value from each read bit-string of data,
        multiplying a result of the subtracting by a value representing a desired module of the phasor that represents a multiple of sinusoidal voltages to be applied to the multi-phase load,
        scaling a result of the multiplying in the range [−1, 1], and
        generating the threshold level as a sum between the scaling and half of an amplitude of the triangular modulating signal.

5. The method of claim 1, further comprising:
    coding values of the angle with a string of ten bits;
    determining which of the six angular sectors of 60° the angle belongs as a function of three most significant bits of the string; and
    determining the difference as a function of seven least significant bits of the string.

6. A non-transitory computer readable medium, comprising:
    software code for determining duty-cycles of respective pulse width modulated (PWM), space vector modulated (SVM) control signals of an inverter with half-bridge switching stages, each half-bridge switching stage controlling a multi-phase motor including a plurality of windings to apply thereto a respective sinusoidal voltage of a period equal to an SVM control period by at least
        storing values of the duty-cycles established as a function of a position of a rotor of the multi-phase motor in at least one look-up table,
        determining for each SVM control period an angle of a phasor that represents a multiple of sinusoidal voltages to be applied to the multi-phase motor, and
        determining the duty-cycles as a function of the angle to apply the respective sinusoidal voltages of the multiple to the respective windings of the multi-phase motor,
    wherein storing comprises storing in the at least one look-up table values of two pre-established waveforms relative to at least one of the duty-cycles as a function of the angle in at least two angular sectors of 60° degrees each by at least
        identifying which of six angular sectors of 60° the angle belongs to,
        calculating a difference between the angle and a lower bound of the identified angular sector, and
        generating values of each of the duty-cycles as a function of the identified angular sector of the difference and of the values of the two pre-established waveforms stored in the at least one look-up table.

7. The non-transitory computer readable medium of claim 6, wherein the look-up table stores values of two different pre-established waveforms relative to one of the duty-cycles for values of the angle comprising two distinct intervals of 30° each, and further comprising:
- values of the duty-cycles generated as a function of the difference and the identified angular sector of 60° to which the angle belongs, by at least
  - reading values from the look-up table related to a first or a second waveform in correspondence of the difference or of a complement thereof to 60°, and
  - generating values of the duty-cycle equal to read values or to a complement to a maximum value of the duty-cycles.

8. A control unit for generating signals representing three duty-cycles of three respective pulse width modulation (PWM), space vector modulation (SVM) control signals of an inverter with three half-bridge switching stages, each half-bridge controlling a three-phase motor including a plurality of windings to apply thereto a respective sinusoidal voltage of period equal to the SVM control period, the control unit comprising:
- a logic block to generate access signals to two look-up tables as a function of a string of ten bits representing an angle of a phasor that represents a triplet of sinusoidal voltages to be applied to the three-phase motor and corresponding bit-strings of output data corresponding to the values read from the two look-up tables; and
- a second logic block being input with the string of ten bits representing the angle and generating in a function thereof the signals representing three duty cycles as replicas of the bit-strings of output data generated by said first logic block;
- the two look-up tables storing values of respective pre-established waveforms relative to one of the duty-cycles for values of the angle comprised in two intervals of 30° each.

9. A control unit for determining duty-cycles of respective pulse width modulated (PWM), space vector modulated (SVM) control signals of an inverter with half-bridge switching stages, each half-bridge switching stage controlling a multi-phase motor including a plurality of windings to apply thereto a respective sinusoidal voltage of a period equal to an SVM control period, the control unit comprising:
- at least one look up table to store values of the duty-cycles established as a function of a position of a rotor of the multi-phase motor;
- a first control circuit to determine for each SVM control period an angle of a phasor that represents a multiple of sinusoidal voltages to be applied to the multi-phase motor; and
- a second control circuit coupled to said first control circuit to determine the duty-cycles as a function of the angle to apply the respective sinusoidal voltages of the multiple to the respective windings of the multi-phase motor;
- the at least one look-up table storing values of two pre-established waveforms relative to at least one of the duty-cycles as a function of the angle in at least two angular sectors of 60° degrees each by at least
  - identifying which of six angular sectors of 60° the angle belongs to,
  - calculating a difference between the angle and a lower bound of the identified angular sector, and
  - generating values of each of the duty-cycles as a function of the identified angular sector of the difference and of the values of the two pre-established waveforms stored in the at least one look-up table.

10. The control unit of claim 9, wherein the look-up table stores values of two different pre-established waveforms relative to one of the duty-cycles for values of the angle comprising two distinct intervals of 30° each, and values of the duty-cycles generated as a function of the difference and the identified angular sector of 60° to which the angle belongs.

11. The control unit of claim 9, further comprising:
- a third control circuit to determine which of the six angular sectors of 60° the angle belongs as a function of three most significant bits of a string of ten bits; and
- a fourth control circuit to determine the difference as a function of seven least significant bits of said string.

* * * * *

UNITED STATES PATENT AND TRADEMARK OFFICE
CERTIFICATE OF CORRECTION

| | | |
|---|---|---|
| PATENT NO. | : 7,791,304 B2 | |
| APPLICATION NO. | : 12/014955 | |
| DATED | : September 7, 2010 | |
| INVENTOR(S) | : Pirozzi et al. | |

It is certified that error appears in the above-identified patent and that said Letters Patent is hereby corrected as shown below:

Column 2, Line 53    Delete: " $\Re m(.)$ "

Insert: -- $\Im m(.)$ --

Column 8, Line 33    Insert: --Therefore,--

Column 13, Line 25   Delete: "allows to"
Insert: --allow it to--

Signed and Sealed this
Twenty-eighth Day of June, 2011

David J. Kappos
*Director of the United States Patent and Trademark Office*